(12) United States Patent  
Wada et al.

(10) Patent No.: US 10,282,013 B2  
(45) Date of Patent: May 7, 2019

(54) PROGRAMMABLE DISPLAY DEVICE

(71) Applicants: UNITED SEVEN CORPORATION, Osaka (JP); DMC CO., LTD., Tokyo (JP); SEEDSWARE CORPORATION, Osaka (JP); UNITEC CO., LTD., Kanagawa (JP)

(72) Inventors: Susumu Wada, Osaka (JP); Seiji Takeda, Tokyo (JP); Ryuichi Tsuchiya, Kanagawa (JP); Yoshiaki Sawada, Kanagawa (JP)

(73) Assignees: UNITED SEVEN CORPORATION, Osaka (JP); DMC CO., LTD., Tokyo (JP); SEEDSWARE CORPORATION, Osaka (JP); UNITEC CO., LTD., Kanagawa (JP)

( * ) Notice: Subject to any disclaimer, the term of this patent is extended or adjusted under 35 U.S.C. 154(b) by 150 days.

(21) Appl. No.: 14/783,613

(22) PCT Filed: May 1, 2014

(86) PCT No.: PCT/JP2014/062052  
§ 371 (c)(1),  
(2) Date: Oct. 9, 2015

(87) PCT Pub. No.: WO2015/068414  
PCT Pub. Date: May 14, 2015

(65) Prior Publication Data  
US 2016/0070405 A1   Mar. 10, 2016

(30) Foreign Application Priority Data

Nov. 11, 2013  (JP) .................................. 2013-233488

(51) Int. Cl.  
*G06F 3/041* (2006.01)  
*G06F 1/26* (2006.01)  
(Continued)

(52) U.S. Cl.  
CPC ............. *G06F 3/0416* (2013.01); *G06F 1/16* (2013.01); *G06F 1/1632* (2013.01);  
(Continued)

(58) Field of Classification Search  
CPC .... G06F 3/0416; G06F 1/3209; G06F 1/1632; G06F 1/266; G06F 3/0412; G06F 3/0488; G06F 1/16; G06F 1/26  
See application file for complete search history.

(56) References Cited

U.S. PATENT DOCUMENTS

| 8,688,037 B2* | 4/2014 | Chatterjee | G06F 1/1632 320/107 |
| 8,773,845 B2* | 7/2014 | Leung | G06F 1/1632 361/679.01 |

(Continued)

FOREIGN PATENT DOCUMENTS

| JP | 2000194472 A | 7/2000 |
| JP | 2008083767 A | 4/2008 |

(Continued)

OTHER PUBLICATIONS

English translation of International Preliminary Report on Patentability dated May 12, 2016.

(Continued)

*Primary Examiner* — Benyam Ketema  
(74) *Attorney, Agent, or Firm* — Harness, Dickey & Pierce, P.L.C.

(57) ABSTRACT

In order to suppress facility cost and improve convenience of input and output of data, a programmable display device includes a cradle section connected to an apparatus to be controlled, and a tablet section attachable and detachable to/from the cradle section. The cradle section and the tablet section transmit and receive information therebetween through short-distance radio communication.

11 Claims, 11 Drawing Sheets

(51) Int. Cl.
*G06F 3/0488* (2013.01)
*G06F 1/16* (2006.01)
*G06F 1/3209* (2019.01)

(52) U.S. Cl.
CPC .............. *G06F 1/1683* (2013.01); *G06F 1/26* (2013.01); *G06F 1/266* (2013.01); *G06F 1/3209* (2013.01); *G06F 3/0412* (2013.01); *G06F 3/0488* (2013.01)

(56) References Cited

U.S. PATENT DOCUMENTS

| | | | | |
|---|---|---|---|---|
| 9,378,702 | B2* | 6/2016 | Chen | G06F 1/1607 |
| 2003/0041206 | A1* | 2/2003 | Dickie | G06F 1/1616 |
| | | | | 710/303 |
| 2004/0186935 | A1* | 9/2004 | Bell | G06F 1/1626 |
| | | | | 710/72 |
| 2006/0144396 | A1* | 7/2006 | DeVries | A61M 16/026 |
| | | | | 128/204.21 |
| 2007/0035917 | A1* | 2/2007 | Hotelling | G06F 1/1632 |
| | | | | 361/679.56 |
| 2009/0031069 | A1* | 1/2009 | Habuto | G11B 27/10 |
| | | | | 710/303 |
| 2009/0251008 | A1 | 10/2009 | Sugaya | |
| 2012/0092377 | A1 | 4/2012 | Stein | |
| 2012/0143707 | A1* | 6/2012 | Jain | G06Q 20/20 |
| | | | | 705/18 |
| 2012/0153870 | A1* | 6/2012 | Kirkup | H05B 33/0863 |
| | | | | 315/312 |
| 2012/0254494 | A1 | 10/2012 | Imai | |
| 2013/0150120 | A1* | 6/2013 | Wu | G06F 1/1626 |
| | | | | 455/556.1 |
| 2013/0203347 | A1* | 8/2013 | Moosavi | H04W 52/0254 |
| | | | | 455/41.1 |
| 2015/0097652 | A1* | 4/2015 | Ishida | B60R 25/04 |
| | | | | 340/5.61 |
| 2015/0352718 | A1* | 12/2015 | Lee | B25J 13/006 |
| | | | | 700/246 |

FOREIGN PATENT DOCUMENTS

| | | |
|---|---|---|
| JP | 2010278941 A | 12/2010 |
| JP | 2012048750 A | 3/2012 |
| JP | 2013033364 A | 2/2013 |
| KR | 10-1321801 B1 | 10/2013 |

OTHER PUBLICATIONS

Extended European Search Report dated Oct. 7, 2016.
Extended European Search Report dated Jan. 26, 2017.
International Search Report PCT/ISA/210 for International Application No. PCT/JP2014/062052 dated Jul. 25, 2014.
Written Opinion of the International Searching Authority PCT/ISA/237 for International Application No. PCT/JP2014/062052 dated Jul. 25, 2014.
International Preliminary Report on Patentability for International Application No. PCT/JP2014/062052 dated Oct. 20, 2014.

* cited by examiner

PROGRAMMABLE DISPLAY DEVICE

TECHNICAL FIELD

The present invention relates to a programmable display device for controlling an apparatus.

BACKGROUND ART

A programmable display device includes at least (i) a display section which displays an image, (ii) an input section which receives a touch input, (iii) an interface via which communication is established with a controller such as a programmable logic controller (PLC), and (iv) a control section which controls the display section, the input section, and the interface. The programmable display device is an operating and display device which functions to (i) display an operating status of the controller on an image displayed by the display section and (ii) receive, from the input section on the display section, an operation input for giving a control instruction to the controller. Since a programmable display device typically has a graphic display function, the programmable display device can display a control panel, a switch, an indicator lamp, etc. on an image prepared in advance, and serves as an operating terminal of a control system. In the control system, the programmable display device provided in the vicinity of each controller (i) displays an operating status etc. of the each controller and (ii) gives a control instruction to the each controller.

The programmable display device stores various kinds of data generated outside or inside of the programmable display device. Examples of the various kinds of data include data (logging data and report data) generated as a result of a control operation in the each controller and the programmable display device. An external memory stores, as the various kinds of data, control data (recipe data) to be given to the each controller. The programmable display device takes the control data in as appropriate.

CITATION LIST

Patent Literature

[Patent Literature 1]
Japanese Patent Application Publication Tokukai No. 2010-278941 (Publication date: Dec. 9, 2010)

SUMMARY OF INVENTION

Technical Problem

Conventionally, a programmable display device is provided for each factory automation (FA) apparatus or machine to be controlled by the programmable display device. Therefore, a factory where a plurality of FA apparatuses etc. are provided needs programmable display devices equal in number to the plurality of FA apparatuses etc. This results in increase in facility cost of the whole factory.

In addition, in terms of stability and reliability of communication or security, it is difficult to input or output data through wireless or wired communication when the programmable display device takes data in from an external memory or when data is obtained from the programmable display device. Therefore, conventionally, created recipe data is inputted or outputted via a portable memory such as a USB memory. Furthermore, the plurality of apparatuses in the factory should be periodically checked, and a user conducts the check by visually recognizing data etc. indicative of a state of each of the plurality of apparatuses which data is supplied to and displayed by a corresponding one of the programmable display devices. Therefore, there is a possibility that a human error occurs in a check result. As such, the programmable display device is conventionally inconvenient of input and output of data.

The present invention was made in view of the problems, and an object of the present invention is to provide a programmable display device capable of suppressing facility cost and improving convenience of input and output of data.

Solution to Problem

In order to attain the object, a programmable display device of the present invention is configured to be a programmable display device including: a touch panel which displays an operation image for receiving an input operation of a user; an input control section which specifies a processing based on the input operation to the operation image; an apparatus control section which controls an apparatus according to the processing specified by the input control section; an apparatus information obtaining section which obtains data related to the apparatus; a display control section which controls the touch panel to display a data image based on the data obtained; a cradle section (i) including the apparatus control section, the apparatus information obtaining section, and a cradle communication section which transmits and receives information to/from an outside through short-distance radio communication and (ii) connected to the apparatus to be controlled; and a tablet section (i) including the touch panel, the input control section, the display control section, and a tablet communication section which transmits and receives information to/from an outside through the short-distance radio communication and (ii) attachable and detachable to/from the cradle section, the cradle section and the tablet section transmitting and receiving information therebetween with use of the cradle communication section and the tablet communication section.

In order to attain the object, a control method, of the present invention, of controlling a programmable display device is configured to be a control method of controlling a programmable display device that includes (i) a cradle section including a cradle communication section which transmits and receives information to/from an outside and being connected to an apparatus to be controlled and (ii) a tablet section including a tablet communication section which transmits and receives information to/from an outside and being attachable and detachable to/from the cradle section, the control method including the steps of: causing the tablet communication section to receive, from the cradle communication section, a confirmation signal that is a short-distance radio signal for confirming whether or not the cradle section is being connected to the tablet section; causing the tablet communication section to transmit a response signal that is the short-distance radio signal for responding to the confirmation signal; and causing the cradle communication section and the tablet communication section to start transmitting and receiving information through short-distance radio communication.

According to the configuration, the programmable display device of the present invention can be divided into (i) the cradle section connected to the apparatus to be controlled and (ii) the tablet section. The cradle section mainly controls the apparatus, and obtains information from the apparatus.

The tablet section includes the touch panel, and mainly carries out an input control and a display control.

A user can control an apparatus which the user wants to control, by connecting the tablet section to a cradle section connected to the apparatus. That is, only the cradle section is required to equal in number to the number of apparatuses, and it is unnecessary to prepare the tablet section so that the number of the tablet section equals to the number of apparatuses. It is therefore possible to reduce facility cost.

According to the configuration, the tablet section is attachable and detachable to/from the cradle section. Therefore, the tablet section is portable by being detached from the cradle section. In a case where data is transmitted and received between (i) an information processing apparatus independent of a communication network including an apparatus and (ii) the apparatus, it is possible to transmit and receive the data automatically or through a user's operation by storing the data in the tablet section and connecting the tablet section to the information processing apparatus or the apparatus (cradle section). In a case where check etc. is carried out with respect to a plurality of apparatuses, it is possible to carry out the check etc. by connecting the tablet section to each of the plurality of apparatuses, and outputting and displaying necessary data.

As such, it is possible to provide a programmable display device capable of (i) suppressing cost for providing the programmable display device for an FA apparatus etc. and (ii) improving convenience of input and output of data.

Moreover, according to the configuration, the programmable display device of the present invention transmits and receives information between the tablet section and the cradle section through the short-distance radio communication. In other words, the information is transmitted and received only when the tablet section and the cradle section are close to each other. This makes it impossible for an unspecified number of people to control an apparatus with use of the tablet section away from the apparatus. It is therefore possible to improve safety of the programmable display device which can be divided into the tablet section and the cradle section.

A programmable display device of each aspect of the present invention can be realized by a computer. In a case where the programmable display device is realized by the computer, the present invention encompasses (i) a control program of the programmable display device for realizing the programmable display device with the computer by causing the computer to operate as each section of the programmable display device and (ii) a computer-readable storage medium in which the control program is stored.

Advantageous Effects of Invention

The present invention brings about an effect of providing a programmable display device capable of (i) suppressing cost for providing the programmable display device for an FA apparatus etc. and (ii) improving convenience of input and output of data.

DESCRIPTION OF EMBODIMENTS

Figure 1:
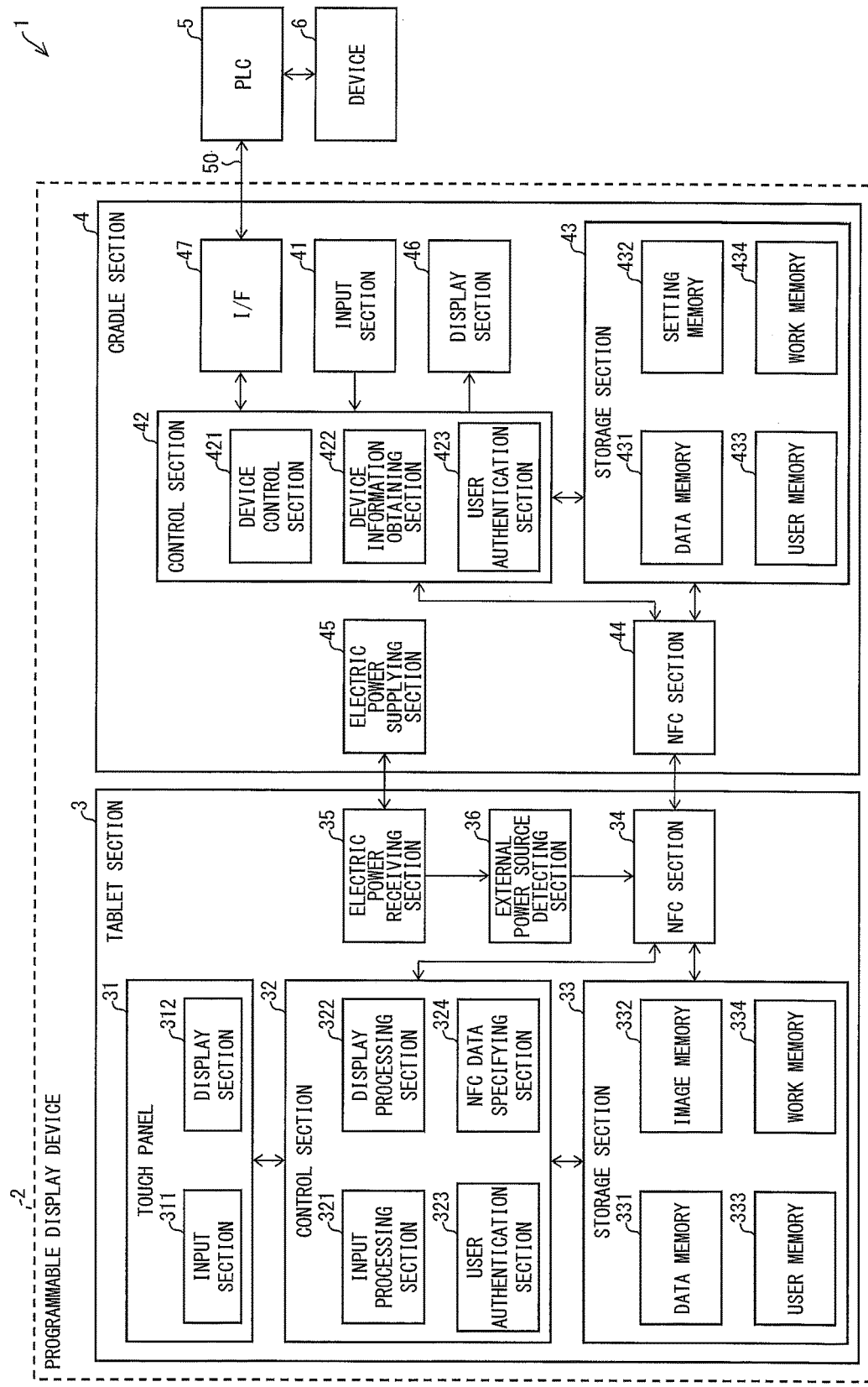
FIG. 1 is a block diagram illustrating a configuration of a control system including a programmable display device of Embodiment 1 of the present invention.

The following description will discuss in detail embodiments of the present invention. For convenience of explanation, identical reference numerals are given to members having respective functions identical to those of members illustrated in the embodiments, and their descriptions are omitted as appropriate. Moreover, shapes of configurations illustrated in the drawings, and dimensions such as length, size and width do not reflect actual shapes and dimensions, but are changed as appropriate for clarification of and simplification of the drawings.

Embodiment 1

Embodiment 1 of the present invention will be described below with reference to FIGS. 1 through 6.

[Configuration of Control System]

First, a configuration of a control system 1 of the present invention will be described with reference to FIG. 1. FIG. 1 is a block diagram illustrating the configuration of the control system 1 including a programmable display device 2 of Embodiment 1.

As illustrated in FIG. 1, the control system 1 of Embodiment 1 includes the programmable display device 2, a programmable logic controller 5 (hereinafter called "PLC 5"), and a device 6. Note that the control system 1 may include a plurality of devices 6.

[Configuration of PLC]

The PLC 5 that is an external apparatus takes a state of the device 6 in from the device 6 via an input unit, and gives a control instruction to the device 6 via an output unit. The PLC 5 carries out the above operations, for example, every predetermined scan time such as several tens of milliseconds according to a sequence program (such as a ladder program) created by a user.

As the device 6, from which the PLC 5 takes the state of the device 6 in, used is an apparatus such as a sensor (e.g., a temperature sensor or an optical sensor) or a switch (e.g., a push-button switch, a limit switch or a pressure switch). As the device 6, to which the PLC 5 gives the control instruction, used is an actuator, a relay, an electromagnetic valve, a display device or the like. This device 6 is provided in necessary sections of various FA apparatuses etc. on a production line etc. to partially constitute the control system 1.

Note that the device 6 may be a specific region of a data memory 431 provided so as to store data entered by a user via a touch panel 31 (later described). Alternatively, the device 6 may be a specific region of a memory in the PLC 5.

The memory (device memory) in the PLC 5 stores, in a region specified by a device address, data (word data and bit data) indicative of the state of the device 6 (an output value from the device 6, and a setting value to the device 6). In the memory, a word device and a bit device are set. Specifically, the word device is set as a region which stores word data such as a numeric value, the word data being to be inputted or outputted. The word device is designated by a word address (device address). The bit device is set as a region which stores bit data indicative of an ON/OFF state etc. The bit device is designated by a bit address (device address). By designating a device address and accessing a given word device or bit device in the memory, it is possible to control the device 6 and to individually take out data indicative of the state of the device 6.

[Configuration of Programmable Display Device]

(Basic Function of Programmable Display Device)

The programmable display device 2 includes (i) a CPU (Central Processing Unit) that executes instructions of an HMI control program realizing functions, (ii) a ROM (Read Only Memory) storing the HMI control program, (iii) a RAM (Random Access Memory) that develops the HMI control program, (iv) a storage device (storage medium), such as a memory, storing the HMI control program and various kinds of data, and the like. The programmable display device 2 is a dedicated computer which displays image data for an input operation and image data to be displayed, the pieces of image data being created by a user, so as to realize an operation function and a display function which are peculiar to a programmable display device. The programmable display device 2 is suitably used as an HMI apparatus. The image data is created in combination with pieces of processing definition information which define various processings related to an input operation and a display operation. From the image data, the programmable display device 2 can identify an operation of displaying the state of the device 6 or an operation of controlling the state of the device 6 in accordance with an input operation.

With its communication function, the programmable display device 2 (i) communicates with the PLC 5 via a communication cable 50 to obtain, as logging data or report data, a state of each device 6 which state is stored in the memory of the PLC 5, and, for example, (ii) displays the state of each device 6 on a display section 312 (later described). With the communication function, the programmable display device 2 further transmits, for example, a control instruction including recipe data to the PLC 5 in response to an input operation to an input section 311 (later described).

The programmable display device 2 may give an instruction for obtaining or changing the state of the device 6, every time the programmable display device 2 obtains or changes the state of the device 6. When the programmable display device 2 obtains or changes the state of the device 6, the programmable display device 2 may synchronize with a situation where each address is allocated, by accessing a memory space (e.g., a data memory 431 (later described)) in the programmable display device 2 and communicating with the PLC 5 at predetermined time intervals or every predetermined event.

(Configuration of Each Section of Programmable Display Device)

The programmable display device 2 of Embodiment 1 includes a tablet section 3 and a cradle section 4. That is, the programmable display device 2 of Embodiment 1 is configured to be divided into the tablet section 3 and the cradle section 4. Note that appearance configurations of the tablet section 3 and the cradle section 4, and a method of attaching and detaching the tablet section 3 and the cradle section 4 to/from each other will be described later. The tablet section 3 of the programmable display device 2 includes the touch panel 31, a control section 32, a storage section 33, an NFC section 34 (tablet communication section), an electric power receiving section (electric power obtaining section), and an external power source detecting section 36. The cradle section 4 of the programmable display device 2 includes an input section 41, a control section 42, a storage section 43, an NFC section 44 (cradle communication section), an electric power supplying section 45 (electric power supplying section), a display section 46, and an interface (I/F) section 47. Major sections of the programmable display device 2 will be described below.

(Configuration of Each Section of Tablet Section)

The touch panel 31 includes the input section 311 and the display section 312. The input section 311 is an input device via which a user enters an instruction signal to the programmable display device 2. The input section 311 includes (i) a touch surface which receives a touch (including an approach) of an indicator (e.g., a user's finger) and (ii) a touch sensor which detects the indicator touching the touch surface, and an input position where the touch surface is touched with the indicator. The touch sensor may be realized by any sensor, provided that the touch sensor can detect touching and untouching the touch surface with the indicator. The touch sensor is realized by, for example, a pressure sensor, an electrostatic capacitive sensor, or an optical sensor. Specifically, the input section 311 supplies, to an input processing section 321 (later described), a signal generated due to a user's touch operation.

The display section 312 is a display device which displays information to be processed by the programmable display device 2. The display section 312 displays information having been processed by a display processing section 322 (later described). The display section 312 displays, for example, an operation image which receives an operation for controlling the device 6. The display section 312 is constituted by, for example, a display device such as an LCD (liquid crystal display).

The control section 32 is configured to process, on the basis of an obtained signal or information, (i) an instruction signal entered mainly via the input section 311 or (ii) information displayed by the display section 312. The control section 32 includes the input processing section 321 (input control section), the display processing section 322 (display control section), and a user authentication section 323 (function restricting section, user information determining section). Note that the control section 32 may include various members which allow the tablet section 3 to be used as a typical tablet terminal.

The input processing section 321 specifies predetermined processing designation information from (i) whether or not a user's touch operation exists and (ii) coordinate information of a touched position, which have been found from a signal generated due to the user's touch operation detected by the input section 31. The input processing section 321 then supplies the specified processing designation information to the NFC section 34. The input processing section 321 also notifies the display processing section 322 of (i) whether or not the user's touch operation exists and (ii) the coordinate information of the touched position. The input processing section 321 may further be configured to chronologically retain the coordinate information of the touched position and to distinguish pieces of coordinate information of trajectories of touch operations entered consecutively throughout a certain period of time.

The display processing section 322 is configured to generate, on the basis of information supplied from the NFC section 34 or the input processing section 321, an image to be displayed by the display section 312. Specifically, upon reception of information from the NFC section 34 or the input processing section 321, the display processing section 322 (i) obtains, on the basis of the information, (a) recipe data stored in a data memory 331 of the storage section 33 (later described), (b) image data stored in an image memory 332, and/or (c) data (logging data, report data) indicative of the state of the device 6 which data has been supplied from the NFC section 34, and (ii) generates an image (data image) to be displayed by the display section 312. The display processing section 322 then causes the display section 312 to display the generated image. Alternatively, the display processing section 322 obtains image data stored in the image memory 332 of the storage section 33 (later described), and generates the above operation image.

The user authentication section 323 is configured to restrict functions of the sections of the tablet section 3. The user authentication section 323 is also configured to identify a user on the basis of information entered by the user. Specifically, upon reception of information entered to the tablet section 3 by a user so that the user is authenticated, the user authentication section 323 searches a user memory 333 of the storage section (later described) for information identical to the received information. In a case where the user authentication section 323 succeeds to find the information identical to the received information, the user authentication section 323 removes restriction on the functions of the sections of the tablet section 3. In contrast, in a case where the user authentication section 323 fails to find the information identical to the received information, the user authentication section 323 maintains the restriction on the functions of the sections of the tablet section 3. In a case where the tablet section 3 and the cradle section 4 are being connected to each other, i.e., in a case where the tablet section 3 and the cradle section 4 are functioning as the programmable display device 2, the user authentication section 323 removes restriction on functions of the sections of the tablet section 3 and the cradle section 4 by succeeding to find the information identical to the received information. This enables the programmable display device 2 to be used. Note that the restriction on the functions of the sections of the tablet section 3 and the cradle section 4 is not specifically limited, and may therefore be determined as appropriate according to, e.g., a situation where the tablet section 3 and the programmable display device 2 are used. Note also that how to enter information for user authentication is not particularly limited, either. Information for user authentication may be entered by entering a password via the touch panel 31 or by reading an ID with a reading section (not illustrated).

An NFC data specifying section 324 is configured to specify, from data (e.g., recipe data) stored in the data memory 331 (later described), data to be transmitted to the cradle section 4 (device 6) connected to the tablet section 3. Specifically, when the NFC data specifying section 324 receives, via the NFC section 34, from the cradle section 4, information (ID) for identifying the cradle section 4 or the device 6, the NFC data specifying section 324 reads, from the data memory 331, data having an ID identical to the received ID. The NFC data specifying section 324 then supplies the read data to the NFC section 34. This makes it possible to automatically specify, from a plurality of pieces of data stored in the tablet section 3, data to be transmitted to the cradle section 4 (device 6) connected to the tablet section 3, merely by connecting the tablet section 3 to the cradle section 4.

Note that data to be transmitted may be specified by a user operating the touch panel 31.

The storage section 33 is configured to non-temporarily or temporarily store various kinds of data. The storage section 33 includes the data memory 331, the image memory 332, the user memory 333, and a work memory 334. Note that the storage section 33 may store various kinds of data which allow the tablet section 3 to be used as a typical tablet terminal.

The data memory 331 is constituted by an SRAM (Static Random Access Memory) or a DRAM (Dynamic Random Access Memory). The data memory 331 stores various kinds of data generated outside or inside of the programmable display device 2. Since the data memory 331 stores different kinds of data as above, the data memory 331 does not need to be necessarily constituted by a single memory but is preferably constituted by different kinds of memory in accordance with kinds of data. Even in a case where the data memory 331 is constituted by a single memory, it is preferable that storage regions vary depending on kinds of data.

Examples of the data stored by the data memory 331 include logging data, report data, and recipe data. The logging data includes (i) data which the PLC 5 has obtained from the device 6 and (ii) data generated inside of the programmable display device 2. The logging data and a time at which the logging data is generated are stored by the data memory 331. The report data is data created based on logging data, and indicative of a result obtained by carrying out extraction under predetermined conditions. The recipe data is data supplied from outside of the programmable display device 2, as has been described. The recipe data is, for example, supplied to the programmable display device 2 via a USB memory. Note that recipe data has an ID given in advance thereto, the ID identifying for which device 6 the recipe data is.

The image memory 332 is a memory for storing an image file etc. An FEPROM (Flash Erasable and Programmable ROM) is used as the image memory 332. The image file is a file including data of at least one image (unit image constituted by one-frame image data) to be displayed by the programmable display device 2. The image file is typically prepared as a collective project file made up of a series of pieces of related image data for (i) the control system 1 including the device 6, (ii) a product produced with the control system 1, or the like.

The image data is created with image creation software. In the image data, (i) a component image is located on a base image, (ii) a figure is drawn, and/or (iii) a text is written.

Examples of the component image include component images of a switch (such as an ON/OFF switch, a changeover switch, or a push-button switch), a lamp, a numeric keypad, various display components (such as a numeric value display component, a meter display component, a graph display component, and an alarm display component, etc.), and the like. These are located with the image creation software. For the component image, a processing for executing a function of the component image is set as the aforementioned processing definition information. For example, for the component image of the switch, the image creation software sets in advance processing definition information which defines processing in which, when the component image of the switch is touched, a value of a bit device designated by a desired bit address switches between "0" and "1".

The user memory 333 is a memory which stores information for identifying a user who uses the programmable display device 2 and the tablet section 3. The work memory 334 is a memory for use in working during computation processing such as display processing.

The NFC section 34 is a communication device which transmits and receives information through short-distance radio communication (which is called near field communication, hereinafter sometimes called "NFC"). The NFC section 34 operates with electric power supplied via the electric power supplying section 45 (later described) from the cradle section 4. The NFC section 34 receives the aforementioned logging data and report data, etc. from the NFC section 44 of the cradle section 4 (later described) through the short-distance radio communication. The NFC section 34 supplies received various kinds of data to the control section 32 and the storage section 33. The storage section 33 stores the various kinds of data. The NFC section 34 transmits, to the NFC section 44, the aforementioned recipe data, and processing designation information on a process which starts in response to a user's touch operation.

The electric power receiving section 35 is configured to receive electric power from outside of the tablet section 3. Specifically, the electric power receiving section 35 receives electric power from the electric power supplying section 45 of the cradle section 4 (later described), and supplies the electric power to the sections (e.g., the NFC section 34 etc.) of the tablet section 3. Supposed is a configuration where the electric power receiving section 35 is connected to the electric power supplying section 45 via terminals. However, the electric power receiving section 35 is not limited to this configuration.

The external power source detecting section 36 (external power source detecting section) is configured to detect electric power having been supplied from outside of the tablet section 3. Specifically, the external power source detecting section 36 detects the electric power receiving section 35 having externally received electric power, and supplies the electric power to the NFC section 34. Note that the external power source detecting section 36, for example, is configured as a circuit for detecting an external power source.

As such, the tablet section 3 mainly has an input function and a display function of various functions of the programmable display device 2.

(Configuration of Sections of Cradle Section)

The input section 41 is an input device via which a user enters an instruction signal to the programmable display device 2. The input section 41 is preferably configured to carry out an easy operation (a simple operation such as RUN/STOP) of the device 6. This allows a user to operate the device 6 even when the user does not have the tablet section 3 nearby. Specifically, with the input section 41, a user can cause the device 6 to stop or start operating in case of emergency. The input section 41 may be, for example, a physical key or a touch panel. Alternatively, the input section 41 may be a combination of the physical key and the touch panel. Note that the cradle section 4 may be configured to include no input section 41.

The control section 42 mainly (i) gives a control instruction of the device 6 to the PLC 5 on the basis of information supplied from the tablet section 3, and (ii) obtains, from the PLC 5, information on the status of the device 6. The control section 42 includes a device control section 421 (apparatus control section), a device information obtaining section 422 (apparatus information obtaining section), and a user authentication section 423.

The device control section 421 is configured to control the device 6. Specifically, on the basis of processing designation information supplied from the NFC section 44, the device control section 421 controls the device 6 by communicating with the PLC 5. The device control section 421 confirms recipe data supplied from the NFC section 44, and if necessary, transfers the confirmed recipe data to the PLC 5. When transferring the confirmed recipe data to the PLC 5, the device control section 421 writes the recipe data to the PLC 5 with reference to an address setting file (later described). Specifically, the device control section 421 (i) reads, from the recipe data supplied from the NFC section 44, a plurality of pieces of data in data format which are set in the address setting file, and (ii) writes the plurality of pieces of data to an address (device address) of the PLC 5 which address has been set in the address setting file.

The device information obtaining section 422 is configured to obtain information on the state (operating state) of the device 6. Specifically, the device information obtaining section 422 obtains, from a device memory of the PLC 5, as status data, the status of the device 6 connected to the PLC 5, by communicating with the PLC 5 at predetermined time intervals or every predetermined event. The device information obtaining section 422 then supplies the obtained status data to the NFC section 44. Note that the device information obtaining section 422 may cause the storage section 43 to store the obtained status data. In a case where the tablet section 3 and the cradle section 4 are not being connected to each other, the device information obtaining section 422 may cause the display section 46 to display the obtained status data.

The user authentication section 423 is configured to restrict the functions of the sections of the cradle section 4. The user authentication section 423 is also configured to identify a user on the basis of information entered by the user. Specifically, upon reception of information entered to the cradle section 4 by a user so that the user is authenticated, the user authentication section 423 searches a user memory 433 of the storage section (later described) for information identical to the received information. In a case where the user authentication section 423 succeeds to find the information identical to the received information, the user authentication section 423 removes restriction on the functions of the sections of the cradle section 4. In contrast, in a case where the user authentication section 423 fails to find the information identical to the received information, the user authentication section 423 maintains the restriction on the functions of the sections of the cradle section 4. Note that the restriction on the functions of the sections of the cradle section 4 is not specifically limited, and may therefore be determined as appropriate according to, e.g., a situation where the cradle section 4 and the programmable display device 2 are used. Note also that how to enter information for user authentication is not particularly limited, either. Information for user authentication may be entered by entering a password via the touch panel 31 or by reading a user ID with a reading section (not illustrated).

The storage section 43 is configured to non-temporarily or temporarily store various kinds of data. The storage section 43 includes the data memory 431, a setting memory 432, the user memory 433, and a work memory 434.

The data memory 431 is constituted by an SRAM or a DRAM. The data memory 431 stores various kinds of data generated outside or inside of the programmable display device 2. Since the data memory 431 stores different kinds of data as above, the data memory 431 does not need to be necessarily constituted by a single memory but is preferably constituted by different kinds of memory in accordance with kinds of data. Even in a case where the data memory 431 is constituted by a single memory, it is preferable that storage regions vary depending on kinds of data. Examples of the data stored by the data memory 431 include the aforementioned logging data, report data, and recipe data.

The setting memory 432 stores an address setting file. This address setting file is referred to by the device control section 421 when the device control section 421 (i) reads logging data or report data and (ii) gives the PLC 5 an instruction of writing of recipe data. In this address setting file set are (i) a device address for writing or reading logging data, report data and recipe data and (ii) various kinds of information on logging data, report data and recipe data. The setting memory 432 may further store information (ID) for identifying the cradle section 4 or the device 6.

The user memory 433 is a memory for storing information for identifying a user who uses the cradle section 4. The work memory 434 is used to temporarily store data exchanged with the PLC 5.

Note that the data stored by the memories of the storage sections 33 and 43 is just an example, and is not limited to the aforementioned examples. For example, the storage section 33 of the tablet section 3 may include a setting memory, and the storage section 43 of the cradle section 4 may include an image memory.

Similar to the NFC section 34, the NFC section 44 is a communication device which transmits and receives information through short-distance radio communication. The NFC section 44 operates with electric power from a power source section in an FA apparatus (not illustrated), the power source section supplying the electric power to the cradle section 4. The NFC section 44 receives recipe data and processing designation information from the NFC section 34 through the short-distance radio communication. The NFC section 44 transmits logging data and report data to the NFC section 34 through the short-distance radio communication. The NFC section 44 regularly outputs an NFC signal for polling in order to confirm whether or not the tablet section 3 is being connected to the cradle section 4. That is, in a case where the tablet section 3 is being connected to the cradle section 4, the NFC section 34 outputs a response signal in response to the NFC signal for the polling. This allows the NFC section 34 and the NFC section 44 to transmit and receive information through the short-distance radio communication.

The electric power supplying section 45 is configured to supply electric power outside of the cradle section 4. Specifically, the electric power supplying section 45 receives electric power from the power source section in the FA apparatus (not illustrated), and supplies the electric power to the electric power receiving section 35 of the tablet section 3 which is being connected to the cradle section 4. Supposed is a configuration where the electric power supplying section 45 is connected to the electric power receiving section 35 via the terminals. However, the electric power supplying section 45 is not limited to this configuration.

The display section 46 is a display device which displays information to be processed by the programmable display device 2. Specifically, in a case where the tablet section 3 and the cradle section 4 are not being connected to each other, the display section 46 displays data indicative of the status of the device 6 which data has been obtained by the device information obtaining section 422. Note that the cradle section 4 may be configured to include no display section 46.

The interface section 47 is a communication control section via which the programmable display device 2 communicates with the PLC 5. This interface section 47 is configured to carry out serial communication, USB communication, or network communication in accordance with a manufacturer or model of the PLC 5.

[Appearance Configurations of Tablet Section and Cradle Section]

Figure 2:
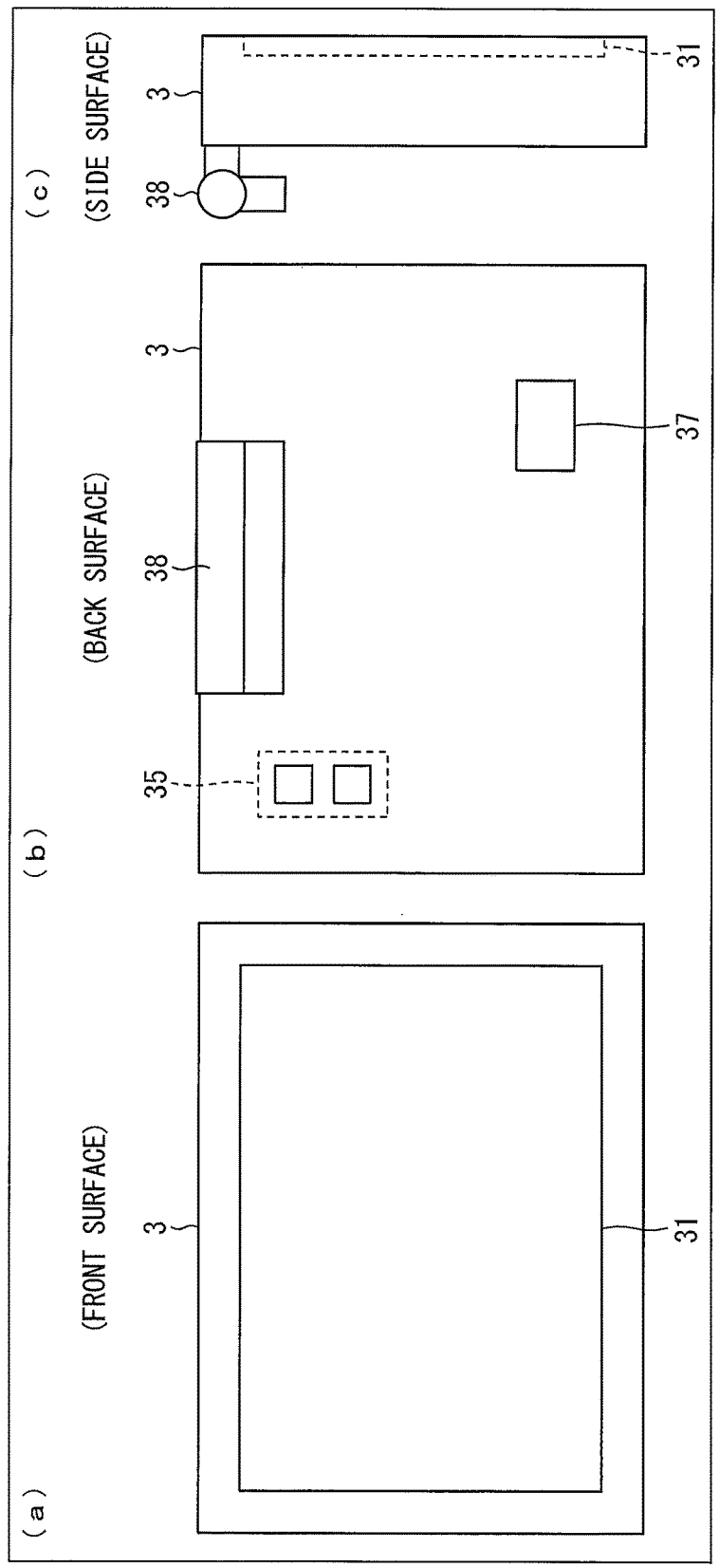
FIG. 2 is a diagram schematically illustrating an appearance of a tablet section of the programmable display device of Embodiment 1 of the present invention.
Figure 3:
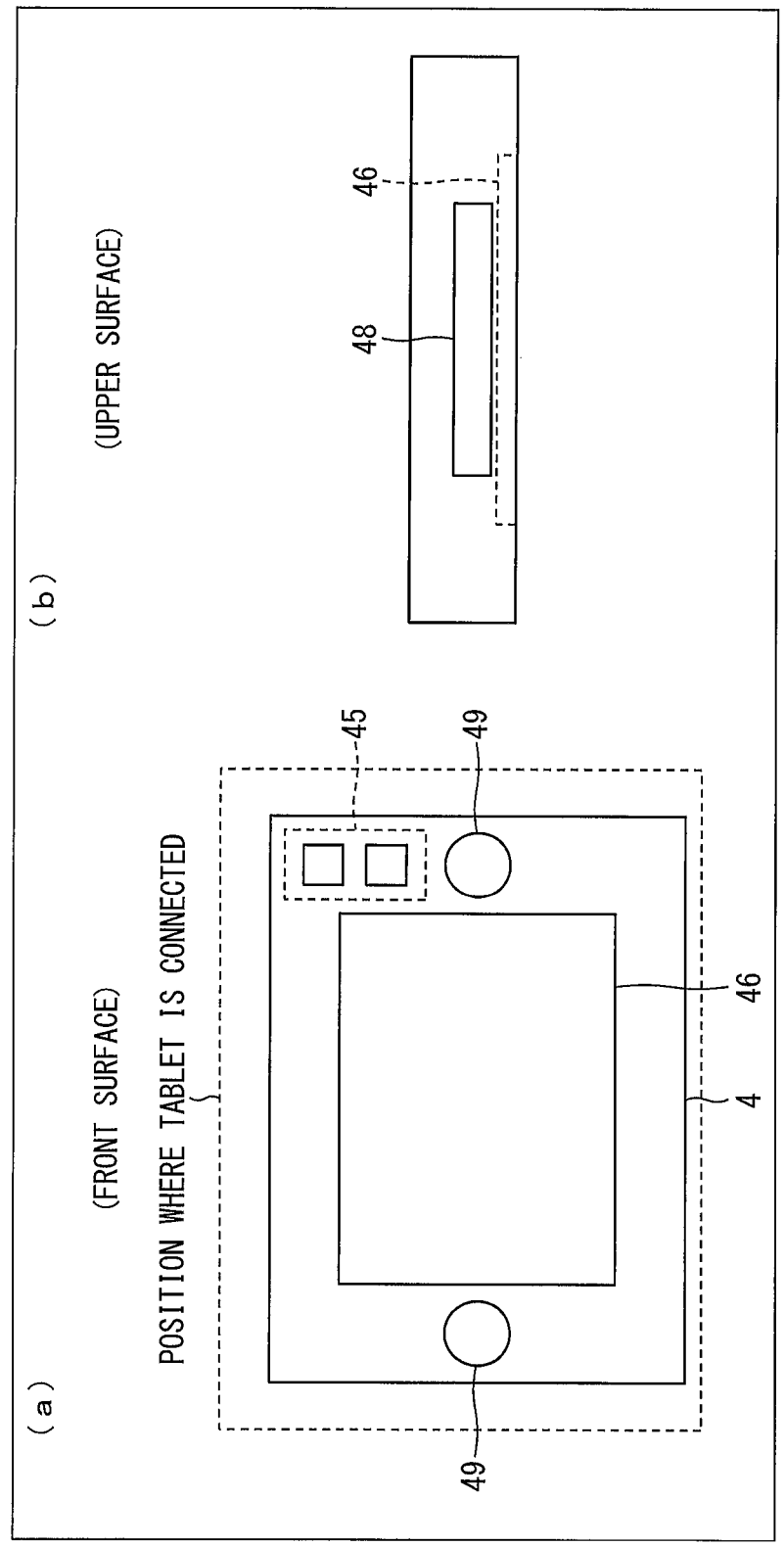
FIG. 3 is a diagram schematically illustrating an appearance of a cradle section of the programmable display device of Embodiment 1 of the present invention.

The following description will discuss appearance configurations of the tablet section 3 and the cradle section 4, with reference to FIGS. 2 and 3. FIG. 2 is a diagram schematically illustrating an appearance of the tablet section 3. FIG. 3 is a diagram schematically illustrating an appearance of the cradle section 4.

The appearance of the tablet section 3 will be described below. Note that FIG. 2 illustrates an example appearance of the tablet section 3. The tablet section 3 may be provided with a member other than members described below. For example, the tablet section 3 may be provided with a USB connector etc. As illustrated in (a) of FIG. 2, the tablet section 3 has a surface provided with the touch panel 31. Note that the surface of the tablet section 3 which surface is provided with the touch panel 31 is hereinafter called a "front surface" of the tablet section 3.

As illustrated in (b) of FIG. 2, the tablet section 3 has a surface (rear surface) opposite to the front surface which rear surface is provided with the electric power receiving section 35, a power source switch 37, and a hook 38 (first connection section). Note that the surface of the tablet section 3 which surface is opposite to the front surface is hereinafter called a "back surface" of the tablet section 3.

The electric power receiving section 35 illustrated in (b) of FIG. 2 is configured as a terminal. The electric power receiving section 35 is located so as to be connected to the electric power supplying section 45 when the tablet section 3 and the cradle section 4 are connected to each other. Note that the configuration where the electric power receiving section 35 is configured as the terminal is an example configuration. The electric power receiving section 35 is not limited to this configuration. The power source switch 37 is a switch via which electric power is supplied to the tablet section 3 so that the tablet section 3 can operate.

The hook 38 is a hook-shaped member as illustrated in (c) of FIG. 2. The hook 38 may have a hinge as illustrated in (c) of FIG. 2. That is, the hook 38 illustrated in (c) of FIG. 2 has a portion parallel to the back surface which portion is configured to rotate about the hinge.

The appearance of the cradle section 4 will be described below. Note that FIG. 3 illustrates an example appearance of the cradle section 4. The cradle section 4 may be provided with a member other than members described below. For example, the cradle section 4 may be provided with a physical key etc. for operating an apparatus.

As illustrated in (a) of FIG. 3, the cradle section 4 has a surface provided with the display section 46. Note that the surface of the cradle section 4 which surface is provided with the display section 46 is hereinafter called a "front surface" of the cradle section 4. The front surface of the cradle section 4 is provided with the electric power supplying section 45 and a magnet 49 (third connection section).

The electric power supplying section 45 illustrated in (a) of FIG. 3 is configured as a terminal. The electric power supplying section 45 is located so as to be connected to the electric power receiving section 35 when the tablet section 3 and the cradle section 4 are connected to each other. Note that the configuration where the electric power supplying section 45 is configured as the terminal is an example configuration. The electric power supplying section 45 is not limited to this configuration.

The magnet 49 maintains connection between the tablet section 3 and the cradle section 4 thanks to magnetic force when the magnet 49 comes into contact with the back surface of the tablet section 3. That is, the back surface of the tablet section 3 is made of a metal attracted by the magnet. Note that kinds of and a material of the magnet 49 are not particularly limited, provided that the tablet section 3 and the cradle section 4 are attachable and detachable to/from each other.

As illustrated in (b) of FIG. 3, the cradle section 4 has a surface provided with a concave portion 48 (second connection section) which surface faces upward when the cradle section 4 is connected to the device 6. Note that the surface of the cradle section 4 which surface faces upward when the cradle section 4 is connected to the device 6 is hereinafter called an "upper surface" of the cradle section 4.

The concave portion 48 is a rectangular dent. Specifically, the concave portion 48 is a dent into which the hook 38 of the tablet section 3 is inserted. The concave portion 48 illustrated in (b) of FIG. 3 has a rectangular shape. This shape is an example shape. The shape of and dimensions (such as size and depth) of the concave portion 48 are not particularly limited, provided that the hook 38 is insertable into the concave portion 48.

As illustrated in (a) of FIG. 3, the front surface of the cradle section 4 may be completely hidden by the tablet section 3 when the tablet section 3 and the cradle section 4 are connected to each other. For example, a surface area of the front surface of the cradle section 4 needs only to allow the tablet section 3 to be connected by a connection method (later described). This makes it possible to reduce a surface area of the device 6 which surface area is occupied by the cradle section 4.

[Connection Method of Connecting Tablet Section and Cradle Section]

Figure 4:
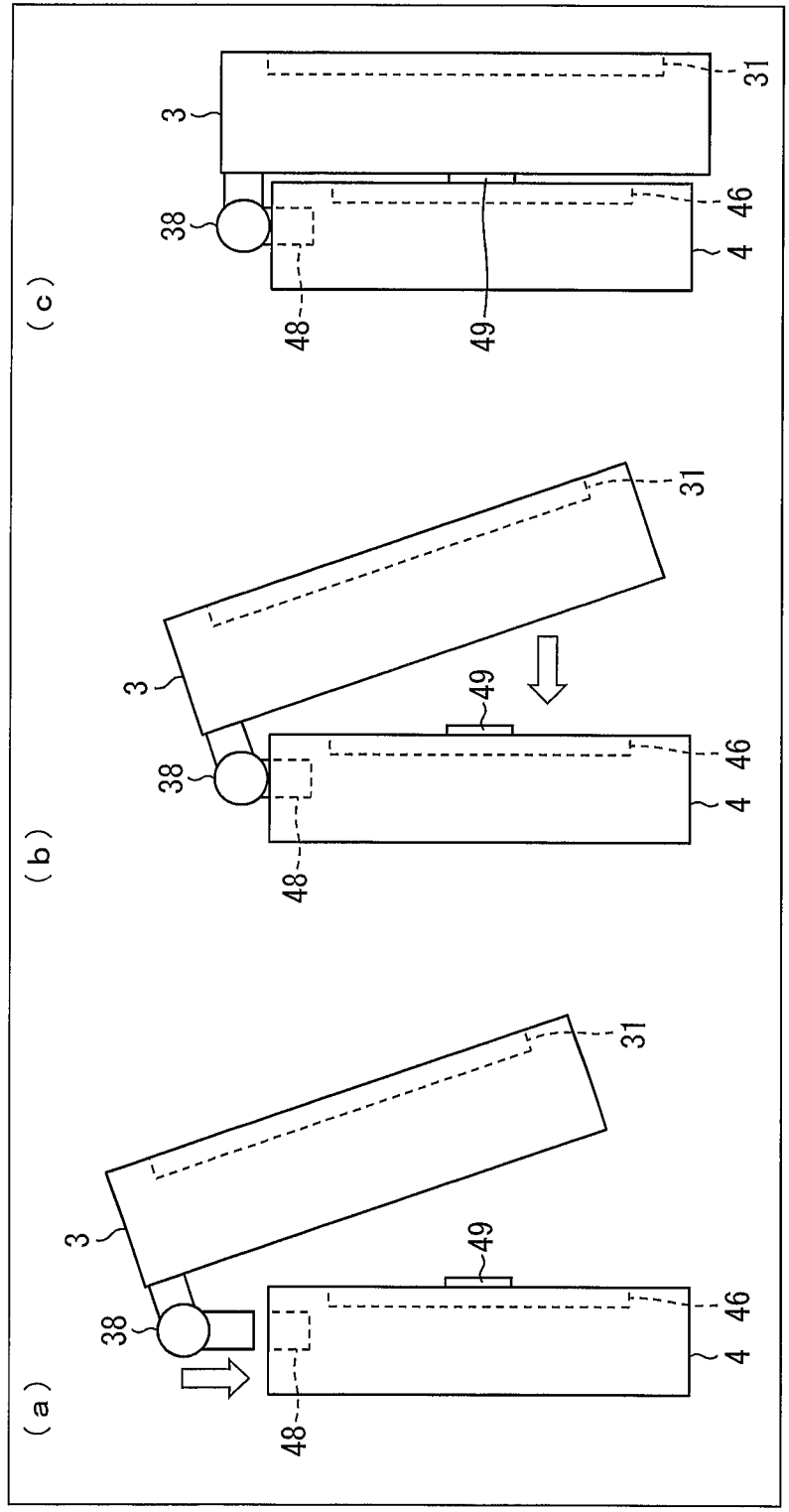
FIG. 4 is a transition diagram illustrating a flow of connection of the tablet section of and the cradle section of the programmable display device of Embodiment 1 of the present invention to each other.

The following description will discuss a method of connecting the tablet section 3 and the cradle section 4 to each other, with reference to FIG. 4. FIG. 4 is a transition diagram illustrating a flow of connection of the tablet section 3 and the cradle section 4 to each other. As illustrated in (a) of FIG. 4, first, the hook 38 of the tablet section 3 is inserted into the concave portion 48 of the cradle section 4. When the hook 38 of the tablet section 3 is inserted into the concave portion 48 of the cradle section 4, it is preferable to rotate an end portion of the hook 38 (a portion of the hook 38 which portion is to be inserted into the concave portion 48) in a direction away from a housing of the tablet section 3 so that the hook 38 is easily inserted into the concave portion 48. As illustrated in (b) of FIG. 4, then, the housing of the tablet section 3 is pushed in a direction to the cradle section 4. This causes the magnet 49 of the cradle section 4 and the back surface of the tablet section 3 to come into contact with each other (see (c) of FIG. 4). The tablet section 3 is fixed thanks to magnetic force of the magnet 49.

As such, the tablet section 3 of and the cradle section 4 of Embodiment 1 are connected to each other by two fixing methods, i.e., (i) fixing the tablet section 3 and the cradle section 4 to each other by inserting the hook 38 into the concave portion 48, and (ii) fixing the tablet section 3 and the cradle section 4 to each other thanks to magnetic force generated by causing the back surface of the tablet section 3 and the magnet 49 to come into contact with each other. This makes it possible to easily and securely connect the tablet section 3 and the cradle section 4 to each other.

The tablet section 3 and the cradle section 4 are detached from each other by (i) pulling the housing of the tablet section 3 in a direction away from the cradle section 4 so that the fixing the back surface of the tablet section 3 and the magnet 48 to each other due to magnetic force is disabled, and then (ii) lifting up the tablet section 3 upward so that the hook 38 is pulled out from the concave portion 48. As such, the tablet section 3 and the cradle section 4 can be easily detached from each other.

[Using Tablet Section and Cradle Section Individually]

The following description will discuss using the tablet section 3 and the cradle section 4 individually. The tablet section 3 can be used as a typical tablet terminal by being detached from the cradle section 4. When the tablet section 3 is used as the typical tablet terminal, the tablet section 3 operates with electric power from a power source section (battery cell) (not illustrated). Note that, in terms of security, it is preferable that only a limited user (such as a factory worker) can use the tablet section 3. Therefore, the tablet section 3 may be configured so that a user carries out user authentication with respect to the tablet section 3. A user authentication method is not particularly limited. The user authentication may be carried out by, for example, (i) entering a password or (ii) reading a user ID through short-distance radio communication.

It is possible to send information stored in another information processing apparatus by causing the storage section 33 of the tablet section 3 to store information which the cradle section 4 has obtained from the PLC 5.

As an example where information obtained from the PLC 5 is sent to the another information processing apparatus described is a case where information is sent to an office PC (personal computer). Typically, the office PC is often provided in a place different from a place (such as a factory) where an FA apparatus etc. is provided. Moreover, the office PC is often independent of a communication network (such as LAN) in a factory, in terms of security and safety. Therefore, in a case where an FA apparatus etc. is conventionally provided with a programmable display device, information should be inputted or outputted via a USB memory etc., and the office PC should process information obtained from the programmable display device. This caused a problem of impairing convenience.

On the other hand, according to the programmable display device 2 of Embodiment 1, it is possible to bring the tablet section 3 to a place where an office PC is provided, by (i) causing the storage section of the tablet section 3 to store information such as logging data and report data, and (ii) detaching the tablet section 3 from the cradle section 4. Then, by connecting the tablet section 3 to the office PC, it is possible to send the information to the office PC.

Figure 5:
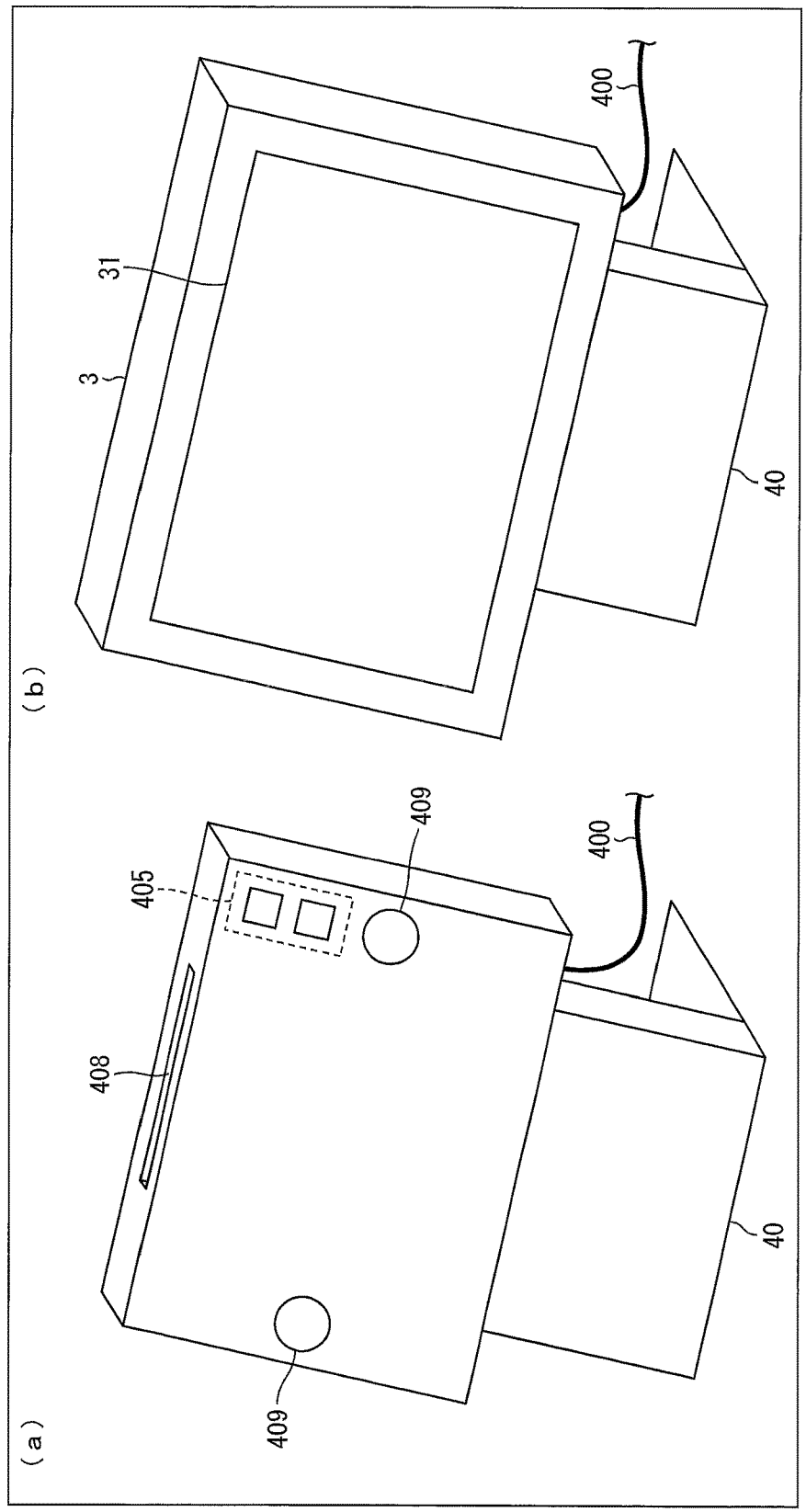
FIG. 5 is a diagram schematically illustrating an appearance of an office cradle of the present invention.

FIG. 5 is a diagram schematically illustrating an appearance of an office cradle 40 to be used when the tablet section 3 is connected to an office PC. As illustrated in (a) of FIG. 5, the office cradle 40 has a surface provided with an electric power supplying section 405 and a magnet 409, the surface coming into contact with the back surface of the tablet section 3. Note that the surface of the office cradle 40 which surface comes into contact with the back surface of the tablet section 3 is hereinafter called a "front surface" of the office cradle 40. Note also that the electric power supplying section 405 and the magnet 409 are similar to the electric power supplying section 45 and the magnet 49 of the cradle section 4, and therefore descriptions of the electric power supplying section 405 and the magnet 409 are omitted.

The office cradle 40 has a surface (hereinafter called an "upper surface" of the office cradle 40) provided with a concave portion 408, the surface facing upward when the office cradle 40 is provided. Note that the concave portion 408 is similar to the concave portion 48 of the cradle section 4, and therefore description of the concave portion 408 is omitted.

That is, the tablet section 3 and the cradle section 4 are connected as illustrated in (b) of FIG. 5 according to a method similar to the aforementioned method of connecting the tablet section 3 and the cradle section 4 to each other. This makes it possible to establish communication between the tablet section 3 and the office PC via a communication cable 400. It is therefore possible to obtain logging data and report data from the tablet section 3, and to store, in the tablet section 3, recipe data created by the office PC.

Note, however, that connection between the tablet section 3 and an information processing apparatus such as the office PC is not limited to the above example. For example, the tablet section 3 may be directly connected to the information processing apparatus via a USB. On the other hand, use of the office cradle 40 brings a merit that a user does not need to hold the tablet section 3 when the office PC and the tablet section 3 are connected to each other.

Since the tablet section 3 and the cradle section 4 can be detached from each other, the number of necessary tablet sections 3 is allowed to be small, whereas the number of cradle sections 4 should equal to the number of necessary FA apparatuses etc. For example, with one tablet section 3, it is possible to (i) transmit, to a plurality of different devices, pieces of recipe data corresponding to the respective plurality of different devices and (ii) store, in the one tablet section 3, pieces of logging data and report data obtained from the respective plurality of different devices.

The following description will discuss using the cradle section 4 individually. As has been described, the cradle section 4 can individually carry out a simple display of the status of the device 6 and a simple operation of the device 6. The simple operation is specifically, for example, stopping and starting the device 6. This makes it possible to stop the device 6 in a situation, such as an emergency situation, where the device 6 should stop, even in a case where a user does not have the tablet section 3 at hand. It is further preferable to configure so that only a limited user can operate the device 6 with the cradle section 4. Therefore, the cradle section 4 may be configured so that a user carries out user authentication with respect to the cradle section 4. A user authentication method is not particularly limited. The user authentication may be carried out by, for example, (i) entering a password or (ii) reading a user ID through short-distance radio communication.

[Flow of Steps in Programmable Display Device]

Figure 6:
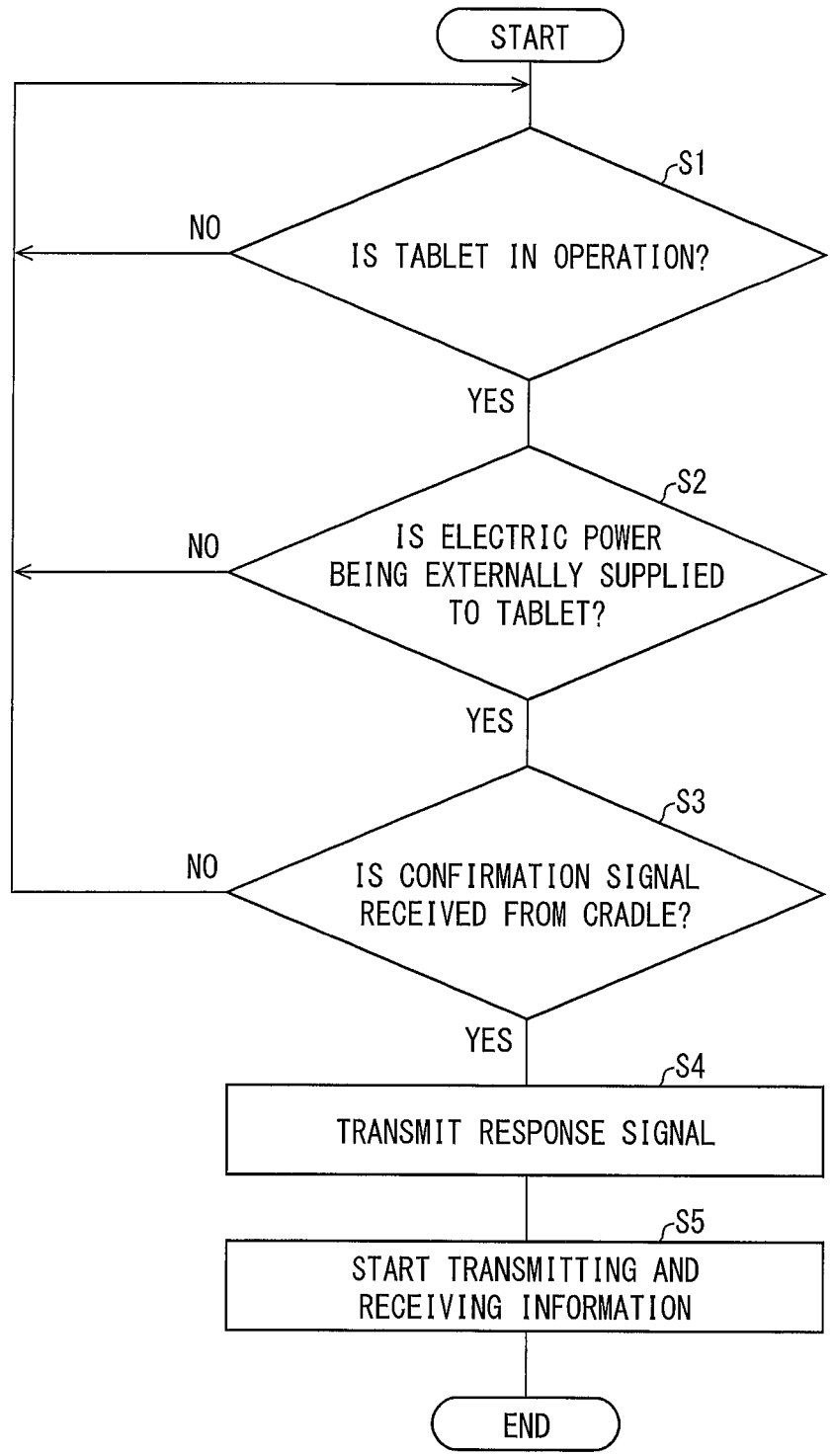
FIG. 6 is a flowchart illustrating a flow of steps in the programmable display device of Embodiment 1 of the present invention.

The following description will discuss a flow of steps in the programmable display device 2 of Embodiment 1. FIG. 6 is a flowchart illustrating a flow of a connection detecting process in the tablet section 3.

When the tablet section 3 is in operation (YES in S1), the external power source detecting section 36 determines whether or not electric power is being externally supplied to the tablet (S2). Specifically, the external power source detecting section 36 detects supply of electric power from the electric power supplying section 45 to the electric power receiving section 35. In a case where the external power source detecting section 36 detects supply of electric power from the electric power supplying section 45 to the electric power receiving section 35 (YES in S2), the external power source detecting section 36 supplies the electric power to the NFC section 34. This causes the NFC section 34 to start operating. This also means detection of connection of the tablet section 3 and the cradle section 4 to each other.

In a case where the NFC section 34 in operation receives a confirmation signal transmitted from the NFC section 44 (YES in S3, confirmation signal receiving step), the NFC section 34 transmits a response signal to the NFC section 44 in response to the confirmation signal (S4, response signal transmitting step). Note here that the confirmation signal is a short-distance radio signal which the NFC section 44 transmits. The confirmation signal is a signal to be transmitted in order to confirm whether or not the cradle section 4 is being connected to the tablet section 3. By transmitting the confirmation signal and receiving the response signal, the cradle section 4 can determine that the cradle section 4 has been connected to the tablet section 3. After S4, information starts to be transmitted and received between the NFC section 34 and the NFC section 44 (S5, short-distance radio communication starting step).

[Action and Effect which are Brought about by Invention in Accordance with Embodiment 1]

As such, the programmable display device 2 of Embodiment 1 includes (i) the cradle section 4 connected to an FA apparatus etc. to be controlled and (ii) the tablet section 3 attachable and detachable to/from the cradle section 4. Therefore, only the cradle section 4 is required to equal in number to the number of FA apparatuses etc., whereas the tablet section 3 is not required to equal in number to the number of FA apparatuses etc. This makes it possible to suppress facility cost.

The tablet section 3 is portable. Therefore, in a case where data is transmitted and received between (i) an information processing apparatus independent of a communication network including an FA apparatus etc. and (ii) the FA apparatus etc., only the following is required. That is, (i) the data is transmitted from the information processing apparatus to the tablet section 3, and then the tablet section 3 is connected to the cradle section 4, or (ii) data obtained from the device 6 is stored in the tablet section 3, and then the tablet section 3 is detached from the cradle section 4 and connected to the information processing apparatus.

Furthermore, the tablet section 3 in which data obtained from the device 6 is being stored is portable. Therefore, in a case where check is carried out with respect to a plurality of FA apparatuses, etc., the tablet section 3 needs only to (i) be connected to cradle sections 4 provided for the respective plurality of FA apparatuses, etc. and (ii) obtain necessary data. This makes it possible to reduce a possibility that a human error occurs during the check. On this account, it is possible to improve convenience of input and output of data.

The tablet section 3 and the cradle section 4 transmit and receive various kinds of information through short-distance radio communication between the respective NFC sections 34 and 44. In other words, information is transmitted and received only when the tablet section 3 is close to the cradle section 4. This makes it impossible for a user to control the device 6 with the tablet section 3 at a place away from an FA apparatus etc. It is therefore possible to improve security of the programmable display device 2 in which the tablet section 3 and the cradle section 4 are detachable from each other.

When the tablet section 3 is connected to the cradle section 4, the NFC section 34 operates with electric power supplied from the cradle section 4 to the tablet section 3 instead of using electric power from the power source section (internal battery cell) (not illustrated) of the tablet section 3. More specifically, the external power source detecting section 36 detects electric power supplied from the cradle section 4. This causes the electric power to be supplied to the NFC section 34, whereby the NFC section 34 starts short-distance radio communication with the NFC section 44. The NFC section 34 operates only when the tablet section 3 is connected to the cradle section 4. The NFC section 34 operates with the electric power supplied from the cradle section 4, and starts communication with the NFC section 44. This allows the cradle section 4 to recognize that the cradle section 4 has been connected to the tablet section 3. It is further possible to reduce power consumption of the tablet section 3.

The user authentication section 323 can restrict functions of the tablet section 3 (functions of the programmable display device 2, in a case where the tablet section 3 and the cradle section 4 are being connected to each other). The user authentication section 423 can restrict functions of the cradle section 4. In a case where externally-supplied user information is identical to user information stored in the user memory 333 and the user memory 433, the user authentication section 323 and the user authentication section 423 remove the restriction on the functions of the tablet section 3 and the restriction on the functions of the cradle section 4, respectively. This allows only a registered user to use the tablet section 3, the cradle section 4, and the programmable display device 2 in which the tablet section 3 and the cradle section 4 are connected to each other. It is therefore possible to prevent an unspecified number of people from controlling the device 6 and using the tablet section 3.

The tablet section 3 has the back surface (i) made of metal and (ii) provided with the hook 38 having a hook shape. The cradle section 4 has (i) the upper surface provided with the concave portion 48 having a concave shape and (ii) the front surface provided with the magnet 49 that is a magnet. The tablet section 3 and the cradle section 4 are fixed to each other by two fixing methods, i.e., (i) fixing the tablet section 3 and the cradle section 4 to each other by inserting the hook 38 into the concave portion 48, and (ii) fixing the tablet section 3 and the cradle section 4 to each other thanks to magnetic force generated by causing the back surface of the tablet section 3 and the magnet 49 to come into contact with each other. This makes it possible to easily and securely connect the tablet section 3 and the cradle section 4 to each other. Since the tablet section 3 and the cradle section 4 are fixed to each other (i) by inserting a convex shape into a concave shape and (ii) with a magnet, the tablet section 3 and the cradle section 4 can be easily detached from each other.

Modification of Example 1

The following description will discuss a modification of Embodiment 1. In this modification, an electric power receiving section 35 of a tablet section 3 and an electric power supplying section 45 of a cradle section 4 are configured to wirelessly supply electric power. That is, when the tablet section 3 and the cradle section 4 are connected to each other, electric power is supplied from the cradle section 4 to the tablet section 3 via radio communication.

According to the configuration, the electric power receiving section 35 and the electric power supplying section 45 have no exposed terminal. This brings about a merit that a problem which occurs due to a configuration of Embodiment 1 "electric power is always being supplied to the electric power supplying section 45" does not occur. The merit will be later described in Embodiment 2.

Embodiment 2

Figure 7:
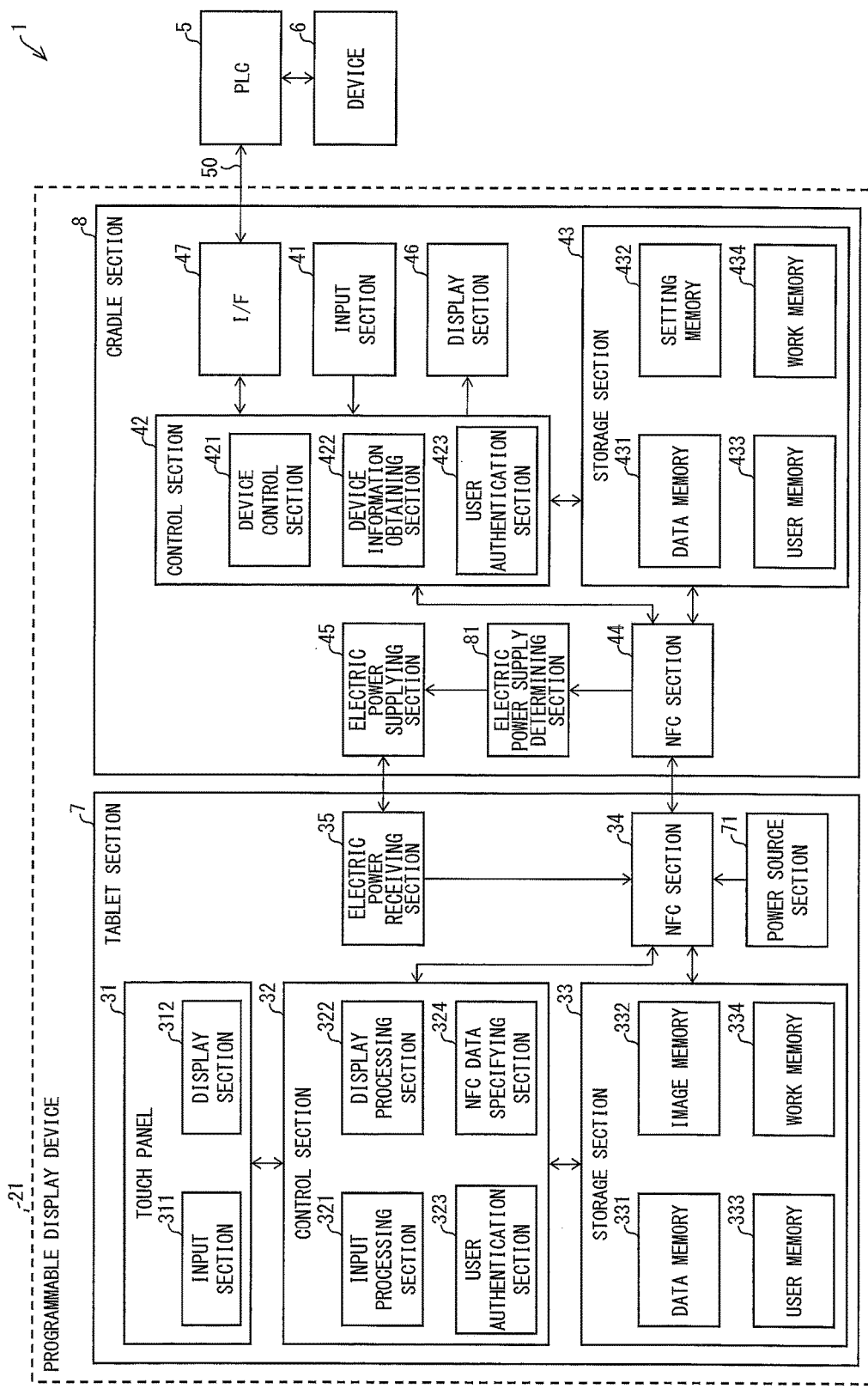
FIG. 7 is a block diagram illustrating a configuration of a control system including a programmable display device of Embodiment 2 of the present invention.
Figure 8:
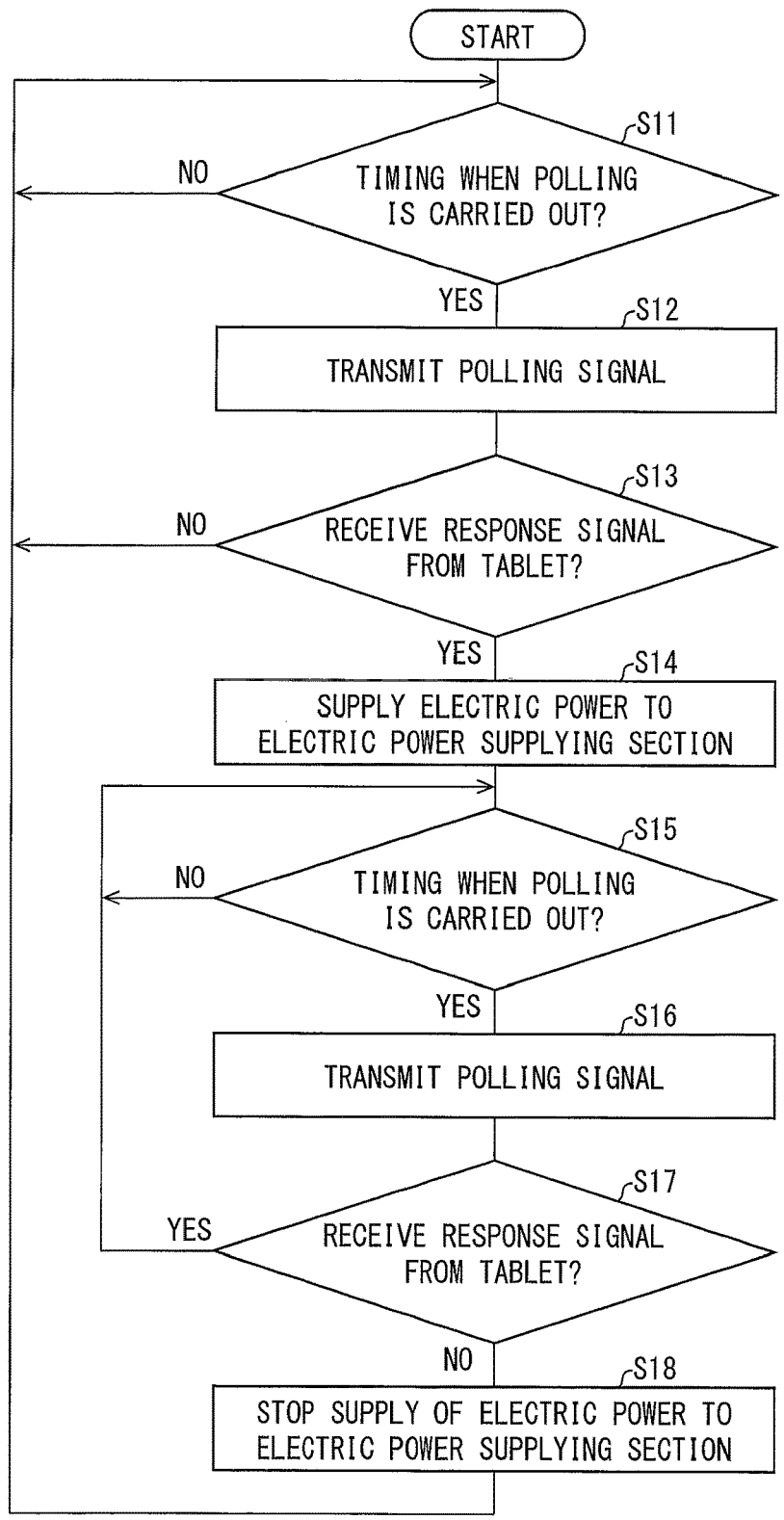
FIG. 8 is a flowchart illustrating a flow of steps in the programmable display device of Embodiment 2 of the present invention.

The following description will discuss Embodiment 2 of the present invention with reference to FIGS. 7 and 8. In Embodiment 2 described is a programmable display device 21 including an electric power supplying section 45 having been subjected to a drip-proof treatment.

In a case where the electric power receiving section of and the electric power supplying section 45 of Embodiment 1 are respective terminals, detachment of the tablet section 3 and the cradle section 4 from each other causes the electric power supplying section 45 to be exposed. Moreover, according to the configuration of Embodiment 1, electric power is always being supplied to the electric power supplying section 45. Note here that liquid often falls on an FA apparatus etc. in a factory where food, pharmaceuticals, etc. are manufactured. A short circuit is caused by adhesion of liquid to the electric power supplying section 45 to which electric power is being supplied.

The programmable display device 21 of Embodiment 2 is configured so that electric power is supplied to the electric power supplying section 45 only when a tablet section 7 is connected to a cradle section 8. According to this configuration, electric power is not supplied to the electric power supplying section 45 while the electric power supplying section 45 is exposed. It is therefore possible to reduce a possibility that a short circuit occurs. Note here that whether or not short-distance radio communication can be established between an NFC section 34 and an NFC section 44 is determined in order to determine whether or not the tablet section 7 has been connected to the cradle section 8. Note that this will be described later in detail.

[Configuration of Programmable Display Device]

A configuration of the programmable display device 21 will be described below with reference to FIG. 7. FIG. 7 is a block diagram illustrating a configuration of a control system 1 including the programmable display device 21 of Embodiment 2.

The tablet section 7 of Embodiment 2 includes a power source section 71. The power source section 71 is a battery cell which supplies electric power with which the tablet section 7 operates. That is, the NFC section 34 of Embodiment 2 is configured to start operating with the electric power supplied from the power source section 71 of the tablet section 7. Note that the NFC section 34 may be configured to operate with electric power supplied from the electric power supplying section 45 after the tablet section 7 and the cradle section 8 are connected to each other. According to the configuration, the NFC section 34 operates with the electric power supplied from the cradle section 8 other than during short-distance radio communication through which connection between the tablet section 7 and the cradle section 8 is confirmed. It is therefore possible to reduce power consumption of the tablet section 7. The tablet section 7 of Embodiment 2 can omit the external power source detecting section 36 included by the tablet section 3 of Embodiment 1.

The cradle section 8 of Embodiment 2 includes an electric power supply determining section 81 (electric power control section, communication determining section). The electric power supply determining section 81 is configured to (i) determine whether or not information can be transmitted and received through short-distance radio communication with the tablet section 3 and (ii) supply electric power to the electric power supplying section 45 when the electric power supply determining section 81 determines that the information can be transmitted and received. Specifically, when the electric power supply determining section 81 receives, from the NFC section 44, information indicating that the NFC section 44 has received a response signal from the NFC section 34, the electric power supply determining section supplies, to the electric power supplying section 45, electric power from a power source section of an FA apparatus (not illustrated) etc. According to the configuration, no electric power is supplied to the electric power supplying section 45 in a case where the short-distance radio communication cannot be established between the NFC section 34 and the NFC section 44, i.e., in a case where the tablet section 7 and the cradle section 8 are not being connected to each other. It is therefore possible to reduce a possibility that a short circuit occurs.

[Flow of Steps in Programmable Display Device]

The following description will discuss a flow of steps in the programmable display device 21 of Embodiment 2. FIG. 8 is a flowchart illustrating a flow of a connection detecting process in the cradle section 8. Note that FIG. 8 illustrates the flow of the connection detecting process in a state where no electric power is supplied to the electric power supplying section 45.

The NFC section 44 transmits a polling signal (short-distance radio signal) (S12) at a timing when polling is carried out (YES in S11). Note that whether or not polling should be carried out may be determined by measuring a predetermined cycle of, e.g., several milliseconds with use of a timer (not illustrated).

When the NFC section 44 receives a response signal from the NFC section 34 of the tablet section 7 (YES in S13), the NFC section 44 supplies, to the electric power supply determining section 81, NFC available information indicating that the NFC section 44 has received the response signal. Upon reception of the NFC available information, the electric power supply determining section supplies, to the electric power supplying section 45, electric power from a power source section (not illustrated) (S14).

The NFC section 44 transmits a polling signal (short-distance radio signal) (S16) at a timing when polling is carried out again (YES in S15). When the NFC section 44 receives a response signal from the NFC section 34 of the tablet section 7 (YES in S17), the connection detecting process returns to S15. When the NFC section 44 does not receive a response signal from the NFC section 34 of the tablet section 7 (NO in S17), in other words, when the tablet section 7 is detached from the cradle section 8, the NFC section 44 supplies, to the electric power supply determining section 81, NFC unavailable information indicating that the NFC section 44 has not received the response signal. Upon reception of the NFC unavailable information, the electric power supply determining section 81 stops supply of electric power from the power source section (not illustrated) to the electric power supplying section 45 (S18).

[Action and Effect which are Brought about by Invention in Accordance with Embodiment 2]

As such, the programmable display device 21 of Embodiment 2 is configured so that electric power is supplied to the electric power supplying section 45 when it is determined that short-distance radio communication can be established between the NFC section 34 and the NFC section 44. According to the configuration, it is possible to determine whether or not the tablet section 7 and the cradle section 8 are being connected to each other, in other words, whether or not the electric power supplying section 45 is exposed. In a case where the electric power supplying section 45 is exposed, no electric power is supplied to the electric power supplying section 45. It is therefore possible to reduce a possibility that a short circuit occurs, even in a case where there is a possibility that liquid adheres to the electric power supplying section 45.

Modification of Embodiment 2

Figure 9:
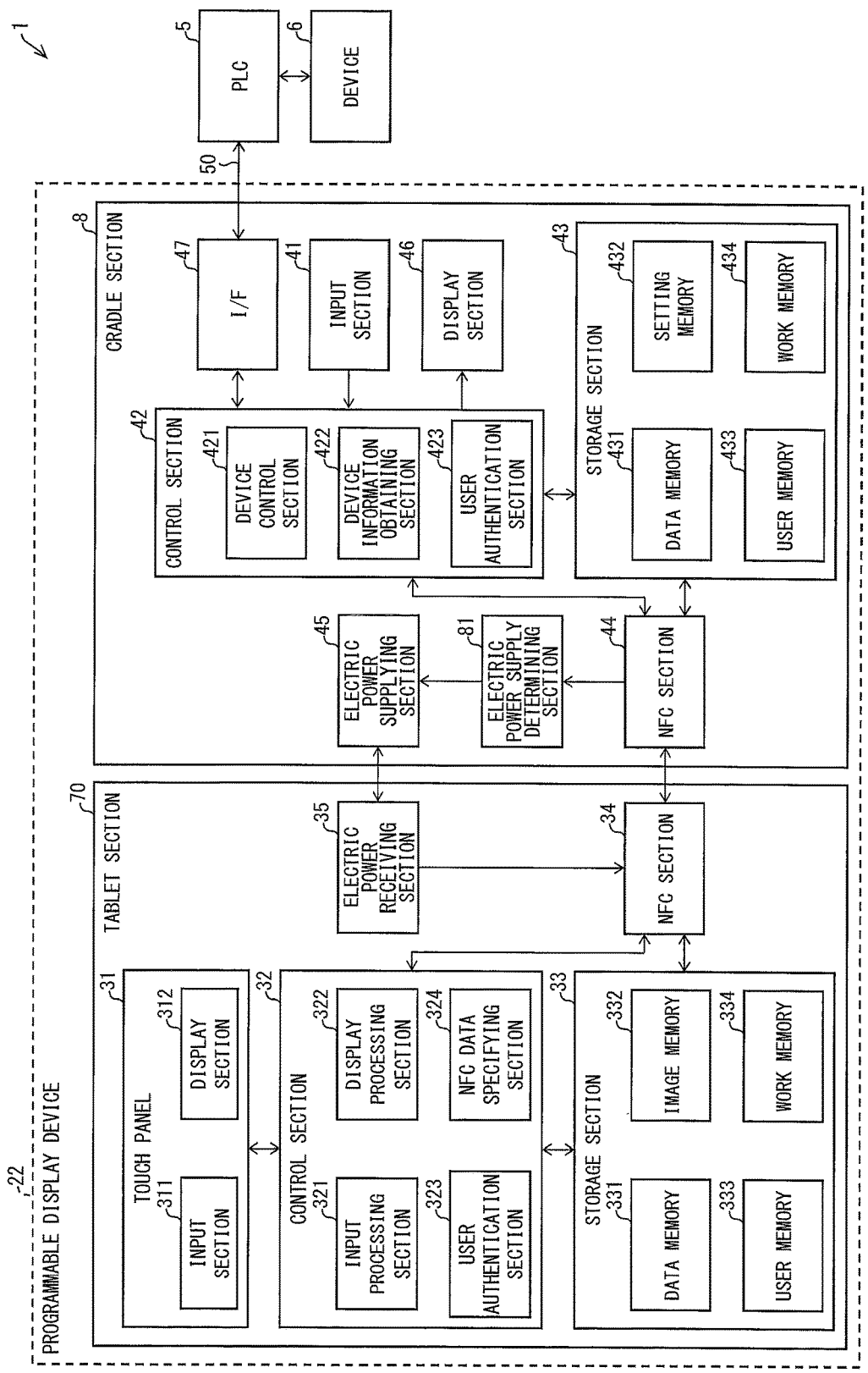
FIG. 9 is a block diagram illustrating a configuration of a control system including a programmable display device of a modification of Embodiment 2 of the present invention.

The following description will discuss a modification of Embodiment 2 with reference to FIG. 9. An NFC section 34 of a tablet section 70 of a programmable display device 22 of this modification is configured to operate by using, as electromotive force, a signal supplied from an NFC section 44. That is, unlike the aforementioned Embodiment 2, the NFC section 34 does not receive electric power from a power source section (battery cell) not illustrated in FIG. 9. Specifically, the NFC section 34 starts operating in response to a polling signal (short-distance radio signal) supplied from the NFC section 44. Then, the NFC section 34 transmits a response signal to the NFC section 44 in response to the polling signal. Upon reception of the response signal, the NFC section 44 supplies, to an electric power supply determining section 81, NFC available information indicating that the NFC section 44 has received the response signal, similar to the aforementioned Embodiment 2. Upon reception of the NFC available information, the electric power supply determining section supplies, to an electric power supplying section 45, electric power from a power source section (not illustrated).

This allows the NFC section 34 to establish NFC communication without receiving electric power from a power source section of the tablet section 70.

[Modifications Common to Embodiments 1 and 2]

Figure 10:
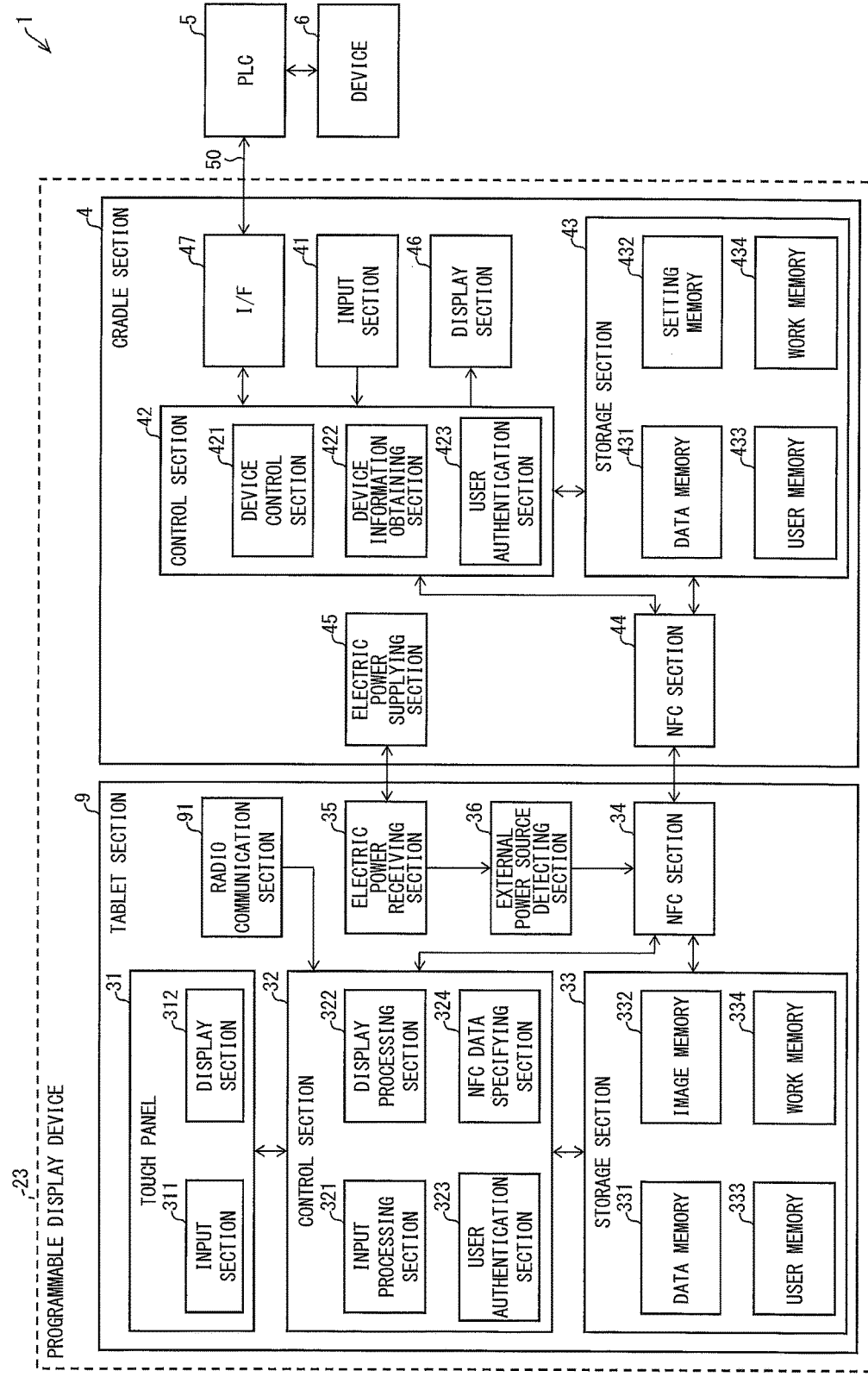
FIG. 10 is a block diagram illustrating a configuration of a control system including a programmable display device of a modification of Embodiment 1 or 2 of the present invention.
Figure 11:
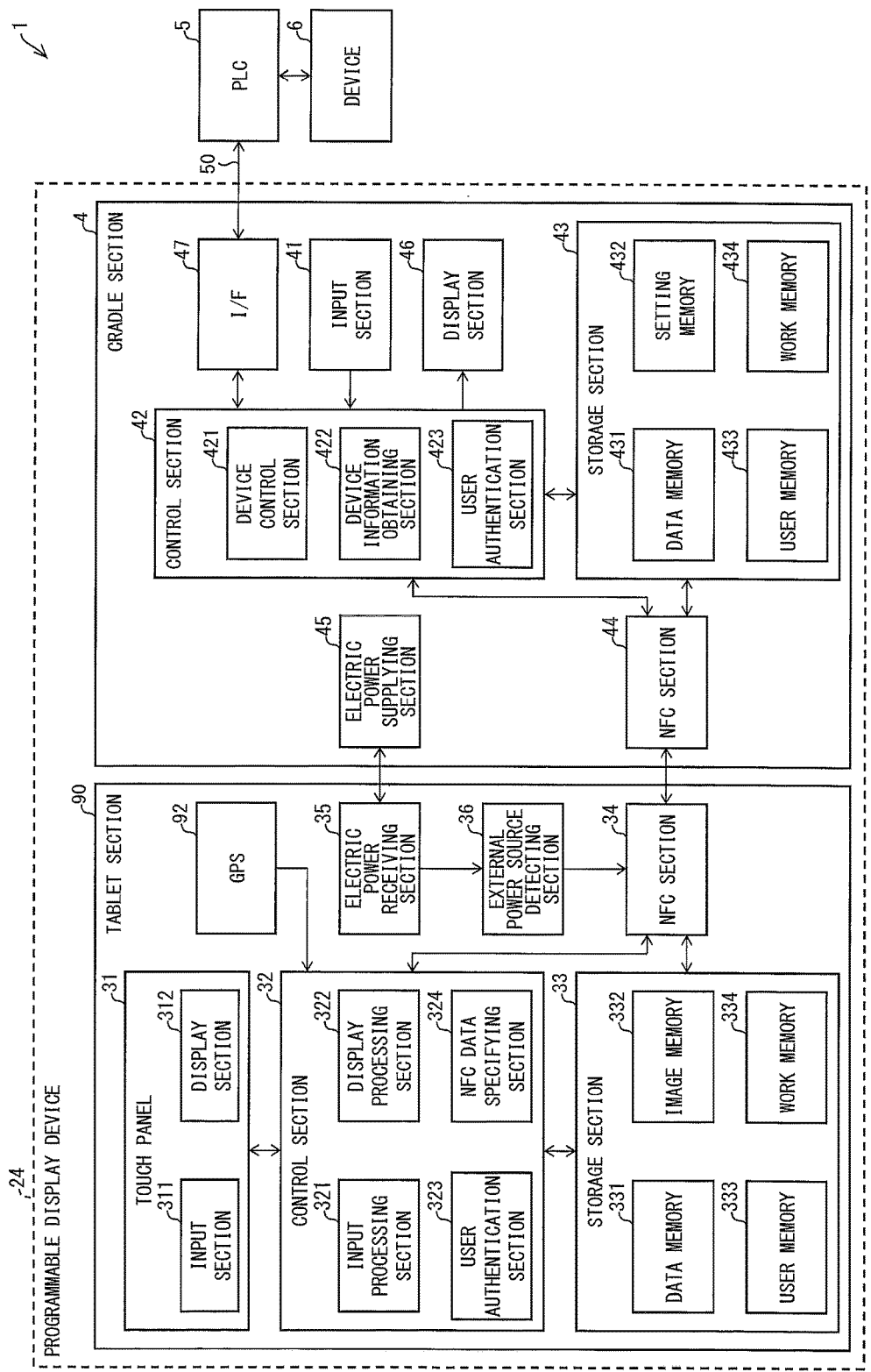
FIG. 11 is a block diagram illustrating a configuration of a control system including a programmable display device of another modification of Embodiment 1 or 2 of the present invention.

The following description will discuss modifications common to Embodiments 1 and 2 with reference to FIGS. 10 and 11.

A programmable display device of the present invention may be configured to select the configuration of Embodiment 1 or the configuration of Embodiment 2, i.e., (i) a configuration where electric power is always supplied to the electric power supplying section 45 or (ii) a configuration where electric power is supplied to the electric power supplying section 45 only when short-distance radio communication can be established between the NFC section 34 and the NFC section 44. This selection may be made with, e.g., a switch (not illustrated).

As illustrated in FIG. 10, a tablet section 9 of a programmable display device 23 of the present invention may include a radio communication section 91 (radio communication determining section). The radio communication section 91 is a communication device which detects a wireless LAN (local area network) and establishes radio communication. The radio communication section 91 may determine whether or not a predetermined wireless LAN (e.g., a wireless LAN usable within a site of a factory) is detectable.

In a case where it is not possible to detect the predetermined wireless LAN, a user authentication section 323 may restrict functions of the tablet section 9. This makes it possible to prevent a user from bringing out the tablet section 9 outside of the site of the factory to use or steal the tablet section 9. The wireless LAN may be, for example, Wi-Fi (Wireless Fidelity, Registered Trademark).

Note that the user authentication section 323 may remove restriction on the functions in a case where (i) the radio communication section 91 succeeds to detect the predetermined wireless LAN and (ii) the user authentication section 323 obtains, from a user memory 333, information identical to information which a user has entered to the tablet section 9 for user authentication.

The radio communication section 91 may be configured to have no function of establishing radio communication but only a function of determining whether or not the predetermined wireless LAN is detectable. What the radio communication section 91 detects is not limited to the wireless LAN. The radio communication section 91 may detect, for example, a WAN (wide area network).

As illustrated in FIG. 11, a tablet section 90 of a programmable display device 24 of the present invention may include a GPS 92 (positional information determining section). The GPS 92 is provided with a sensor which detects positional information indicative of a position of the tablet section 90. The GPS 92 may determine whether or not detected positional information is positional information indicating that the position of the tablet section 90 is within a predetermined range (e.g., within a site of a factory). When the GPS 92 determines that the position of the tablet section 90 is not within the predetermined range, a user authentication section 323 may restrict functions of the tablet section 90. This makes it possible to prevent a user from bringing out the tablet section 90 outside of the site of the factory to use or steal the tablet section 90.

Note that the user authentication section 323 may remove restriction on the functions in a case where (i) the GPS 92 determines that the position of the tablet section 90 is within the predetermined range and (ii) the user authentication section 323 obtains, from a user memory 333, information identical to information which a user has entered to the tablet section 90 for user authentication.

A programmable display device of the present invention may further be configured to (i) include an electric power receiving section 35 and an electric power supplying section 45 which wirelessly receives and supplies electric power, respectively and (ii) supply electric power to the electric power supplying section 45 only when short-distance radio communication can be established between an NFC section 34 and an NFC section 44. In this case, the NFC section 34 may be configured to (i) start operating with electric power from a power source section (internal battery cell) of a tablet section or (ii) operate by using, as electromotive force, a signal supplied from the NFC section 44.

[Software Implementation Example]

Control blocks (particularly, the input processing section 321, the display processing section 322, the user authentication section 323, the device control section 421, the device information obtaining section 422, and the user authentication section 423) of the tablet section 3, the tablet section 7, the tablet section 70, the tablet section 9, the tablet section 90, the cradle section 4, and the cradle section 8 can be realized by a logic circuit (hardware) provided in an integrated circuit (IC chip) or the like or can be alternatively realized by software as executed by a CPU (Central Processing Unit).

In the latter case, each of the tablet section 3, the tablet section 7, the tablet section 70, the tablet section 9, the tablet section 90, the cradle section 4, and the cradle section 8 includes: a CPU that executes instructions of a program that is software realizing the foregoing functions; a ROM (Read Only Memory) or a storage device (each referred to as "storage medium") in which the program and various kinds of data are stored so as to be readable by a computer (or a CPU); and a RAM (Random Access Memory) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be made available to the computer via any transmission medium (such as a communication network or a broadcast wave) which allows the program to be transmitted. Note that the present invention can also be achieved in the form of a data signal in which the program is embodied via electronic transmission and which is embedded in a carrier wave.

[Additional Description]

The present invention can also be construed as below.

That is, the programmable display device of the present invention can be further configured so that the tablet section further includes (i) an electric power obtaining section which obtains electric power from the outside and (ii) an external power source detecting section which detects supply of the electric power from the outside, and the tablet communication section starts the short-distance radio communication when the external power source detecting section detects that the electric power obtaining section has obtained the electric power from the outside.

According to the configuration, in this case, the tablet communication section operates with the electric power from the outside, and starts the short-distance radio communication. It is therefore possible to reduce power consumption of the tablet communication section. An example of the electric power from the outside is electric power supplied from the cradle section. That is, the tablet communication section operates when the tablet section and the cradle section are connected to each other. This allows the cradle communication section to receive the short-distance radio communication from the tablet communication section, whereby the tablet section and the cradle section can transmit and receive information therebetween.

It is further preferable to configure the programmable display device of the present invention so that the cradle section further includes (i) an electric power supplying section which supplies electric power to the outside, (ii) an electric power control section which controls electric power to be supplied from a power source of the apparatus to the electric power supplying section and (iii) a communication determining section which determines whether or not information is transmittable and receivable through the short-distance radio communication with the tablet section, and when the communication determining section determines that information is transmittable and receivable through the short-distance radio communication with the tablet section, the electric power control section supplies, to the electric power supplying section, the electric power from the power source of the apparatus.

According to the configuration, the electric power from the power source of the apparatus is supplied to the electric power supplying section when the cradle section determines that the short-distance radio communication can be established between the tablet communication section and the cradle communication section. This makes it possible to determine whether or not the tablet section and the cradle section are being connected to each other, in other words, whether or not the electric power supplying section is exposed. In a case where the electric power supplying section is exposed, no electric power is supplied to the electric power supplying section. It is therefore possible to reduce a possibility that a short circuit occurs even at a place where liquid possibly adheres to the electric power supplying section.

It is further preferable to configure the programmable display device of the present invention so that the tablet communication section operates by using, as electromotive force, a signal transmitted from the cradle communication section.

According to the configuration, the tablet communication section starts operating upon reception of the signal transmitted from the cradle communication section. Therefore, the tablet communication section can carry out the short-distance radio communication without receiving supply of electric power from a power source of the tablet section.

It is further preferable to configure the programmable display device of the present invention so that the tablet section further includes (i) a function restricting section which restricts a function of the tablet section, (ii) a storage section which stores user information which identifies the user and (iii) a user information determining section which determines whether or not the user information stored by the storage section and externally supplied user information are identical to each other, and the function restricting section removes restriction on the function of the tablet section when the user information determining section determines that the user information stored by the storage section and the externally supplied user information are identical to each other.

According to the configuration, the function of the tablet section can be restricted, and the restriction on the function of the tablet section is removed when the user information stored by the storage section and the externally supplied user information are identical to each other. This allows only a user whose user information is stored by the tablet section to use the tablet section whose function is not restricted. It is therefore possible to prevent an unspecific number of people from controlling an apparatus and using the tablet section. It is also possible to prevent an unregistered user from stealing the tablet section.

It is further preferable to configure the programmable display device of the present invention so that the tablet section further includes a radio communication determining section which determines whether or not radio communication other than the short-distance radio communication is available via a predetermined communication network, and the function restricting section removes the restriction on the function of the tablet section when (i) the radio communication determining section determines that the radio communication is available via the predetermined communication network and (ii) the user information determining section determines that the user information stored by the storage section and the externally supplied user information are identical to each other.

According to the configuration, the restriction on the function of the tablet section is removed when (i) the radio communication (other than the short-distance radio communication) is available via the predetermined communication network, in addition to when (ii) the user information stored by the storage section and the externally supplied user information are identical to each other. In other words, the restriction on the function of the tablet section is not removed when the tablet section is located at a place where the radio communication is not available via the predetermined communication network. This makes it impossible for a user to use the tablet section whose functional restriction is removed even if the user brings out or steals the tablet section. It is therefore possible to prevent the user from bringing out and stealing the tablet section.

It is further preferable to configure the programmable display device of the present invention so that the tablet section further includes a positional information determining section which (i) obtains positional information of the tablet section and (ii) determines whether or not the positional information obtained is included in a predetermined range, and the function restricting section removes the restriction on the function of the tablet section when (i) the positional information determining section determines that the positional information obtained is included in the predetermined range and (ii) the user information determining section determines that the user information stored by the storage section and the externally supplied user information are identical to each other.

According to the configuration, the restriction on the function of the tablet section is removed when (i) the positional information of the tablet section is included in the predetermined range, in addition to when (ii) the user information stored by the storage section and the externally supplied user information are identical to each other. In other words, the restriction on the function of the tablet section is not removed when the positional information of the tablet section is not included in the predetermined range. This makes it impossible for a user to use the tablet section whose functional restriction is removed even if the user brings out or steals the tablet section. It is therefore possible to prevent the user from bringing out and stealing the tablet section.

It is further preferable to configure the programmable display device of the present invention so that the tablet section (i) has a back surface made of metal, the back surface being opposite to a surface of the tablet section which surface is provided with the touch panel and (ii) further includes a first connection section having a hook shape, the back surface being provided with the first connection section, the cradle section further includes (i) a second connection section having a concave shape, the second connection section being provided in a surface of the cradle section which surface faces upward when the cradle section is connected to the apparatus and (ii) a third connection section that is a magnet with which a surface of the cradle section is provided, the surface coming into contact with the back surface of the tablet section when the tablet section is connected to the cradle section, and the first connection section of the tablet section is inserted into the second connection section, and the third connection section comes into contact with the back surface of the tablet section, so that the cradle section fixes the tablet section.

According to the configuration, the cradle section fixes the tablet section by two kinds of fixing method, i.e., (i) fixing by inserting the first connection section into the second connection section, and (ii) fixing thanks to magnetic force generated by causing the back surface of the tablet section and the third connection section to come into contact with each other. This makes it possible to easily and securely connect the tablet section and the cradle section to each other. Since the cradle section fixes the tablet section by (i) inserting a convex shape into the concave shape and (ii) with the magnet, the tablet section and the cradle section can be easily detached from each other.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a programmable display device for controlling a device.

REFERENCE SIGNS LIST

2: Programmable display device
3: Tablet section
4: Cradle section
31: Touch panel
33: Storage section
34: NFC section (tablet communication section)
35: Electric power receiving section (electric power obtaining section)
36: External power source detecting section (external power source detecting section)
38: Hook (first connection section)
44: NFC section (cradle communication section)
45: Electric power supplying section (electric power supplying section)
48: Concave portion (second connection section)
49: Magnet (third connection section)
81: Electric power supply determining section (electric power control section, communication determining section)
91: Radio communication section (radio communication determining section)
92: GPS (positional information determining section)
321: Input processing section (input control section)
322: Display processing section (display control section)
323: User authentication section (function restricting section, user information determining section)
421: Device control section (Apparatus control section)
422: Device information obtaining section (apparatus information obtaining section)
S3: Confirmation signal receiving step
S4: Response signal transmitting step
S5: Short-distance radio communication starting step

The invention claimed is:

1. A programmable display device comprising:
a tablet section including
a touch panel which displays an operation image for receiving an input operation of a user,
an input control section which specifies a processing based on the input operation to the operation image, and
a display control section which controls the touch panel to display a data image based on data obtained;
a cradle section including
a tablet mount on an exterior surface of the cradle section;
a user tactile input section;
a display;
an apparatus control section which controls an apparatus, remote from the programmable display device and monitored by the cradle section, according to the processing specified by the input control section,
an apparatus information obtaining section which obtains data from the apparatus, and
a cradle communication section which transmits and receives information to/from the outside through near-field communication and (ii) connected to the apparatus to be controlled;
wherein
the tablet section has a first connection section thereon and a tablet communication section which transmits and receives information to/from the cradle section through a near-field communication and (ii) mountable to/from the cradle section via the first connection section of the tablet section and a second connection section on the cradle section,
and,
the cradle section and the tablet section configured to transmit and receive therebetween through the near-field communication with use of the cradle communication section and the tablet communication section when the tablet section is connected to the cradle section,
the cradle section is configured to exchange information with the apparatus directly connected to the cradle section,
the tablet section is configured to exchange information, via the cradle section, with the apparatus connected to the cradle section, and
the apparatus being controlled on the basis of the information transmitted from the tablet section to the cradle section.

2. The programmable display device as set forth in claim 1, wherein the tablet section further includes (i) an electric power obtaining section which obtains electric power from the cradle section and (ii) an external power source detecting section which detects supply of the electric power from the cradle section, and
the tablet communication section starts the near-field communication when the external power source detecting section detects that the electric power obtaining section has obtained the electric power from the cradle section.

3. The programmable display device as set forth in claim 1, wherein the cradle section further includes (i) an electric power supplying section which supplies electric power to the tablet section, (ii) an electric power control section which controls electric power to be supplied from a power source of the apparatus to the electric power supplying section and (iii) a communication determining section which determines whether or not information is transmittable and receivable through the near-field communication with the tablet section, and
when the communication determining section determines that information is transmittable and receivable through the near-field communication with the tablet section, the electric power control section supplies, to the electric power supplying section, the electric power from the power source of the apparatus.

4. The programmable display device as set forth in claim 1, wherein the tablet communication section operates by using, as electromotive force, a signal transmitted from the cradle communication section.

5. The programmable display device as set forth in claim 1, wherein the tablet section further includes (i) a function restricting section which restricts a function of the tablet section, (ii) a storage section which stores user information which undoubtedly identifies the user and (iii) a user information determining section which determines whether or not the user information stored by the storage section and externally supplied user information are identical to each other, and the function restricting section removes restriction on the function of the tablet section when the user information determining section determines that the user information stored by the storage section and the externally supplied user information are identical to each other.

6. The programmable display device as set forth in claim 5, wherein the tablet section further includes a radio communication determining section which determines whether or not radio communication other than the near-field communication is available via a predetermined communication network, and the function restricting section removes the restriction on the function of the tablet section when (i) the radio communication determining section determines that the radio communication is available via the predetermined communication network and (ii) the user information determining section determines that the user information stored by the storage section and the externally supplied user information are identical to each other.

7. The programmable display device as set forth in claim 5, wherein the tablet section further includes a positional information determining section which (i) obtains positional information of the tablet section and (ii) determines whether or not the positional information obtained is included in a predetermined range, and the function restricting section removes the restriction on the function of the tablet section when (i) the positional information determining section determines that the positional information obtained is included in the predetermined range and (ii) the user information determining section determines that the user information stored by the storage section and the externally supplied user information are identical to each other.

8. The programmable display device as set forth in claim 1, wherein the tablet section (i) has a back surface made of metal, the back surface being opposite to a surface of the tablet section which surface is provided with the touch panel and (ii) the first connection section has a hook shape, the back surface being provided with the first connection section, the second connection section has a concave shape, the second connection section being provided in a surface of the cradle section which surface faces upward when the cradle section is connected to the apparatus and (ii) a third connection section that is a magnet with which a surface of the cradle section is provided, the surface coming into contact with the back surface of the tablet section when the tablet section is connected to the cradle section, and the first connection section of the tablet section is inserted into the second connection section, and the third connection section comes into contact with the back surface of the tablet section, so that the cradle section fixes the tablet section.

9. A control method of controlling a programmable display device that includes (i) a cradle section including a cradle communication section which transmits and receives information to/from an outside and being connected to an apparatus to be controlled and (ii) a tablet section including a tablet communication section which transmits and receives information to/from an outside and being attachable and detachable to/from the cradle section, the control method comprising the steps of:

causing the tablet communication section to receive, from the cradle communication section, a confirmation signal that is a near-field communication signal for confirming whether or not the cradle section is being connected to the tablet section;

causing the tablet communication section to transmit a response signal that is the near-field communication signal for responding to the confirmation signal;

causing the cradle communication section and the tablet communication section to start transmitting and receiving information through near-field communication by connecting the tablet section to the cradle section, the cradle section exchanging information with the apparatus directly connected to the cradle section, the tablet section exchanging information, via the cradle section, with the apparatus connected to the cradle section, and controlling the apparatus on the basis of the information transmitted from the tablet section of the cradle section.

10. The programmable display device as set forth in claim 1, wherein the cradle section includes a display section which displays information to be processed by the programmable display device when the tablet section and the cradle section are not being connected to each other.

11. The programmable display device as set forth in claim 1, wherein the apparatus control section of the cradle section is configured to control the apparatus according to processing by user input directly at the tablet section and input directly at the cradle section via the user tactile input section.

* * * * *